(12) United States Patent
Kim et al.

(10) Patent No.: US 11,041,671 B2
(45) Date of Patent: *Jun. 22, 2021

(54) REFRIGERATOR

(71) Applicant: LG Electronics Inc., Seoul (KR)

(72) Inventors: Dongjeong Kim, Seoul (KR); Ayeong Lee, Seoul (KR); Jungjae Lee, Seoul (KR); Jinho Chang, Seoul (KR); Jaehoon Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/785,428

(22) Filed: Feb. 7, 2020

(65) Prior Publication Data

US 2020/0173710 A1 Jun. 4, 2020

Related U.S. Application Data

(63) Continuation of application No. 16/260,756, filed on Jan. 29, 2019, now Pat. No. 10,591,202, which is a
(Continued)

(30) Foreign Application Priority Data

Jul. 30, 2015 (KR) .................. 10-2015-0108162
Jul. 30, 2015 (KR) .................. 10-2015-0108163

(51) Int. Cl.
*F25D 23/02* (2006.01)
*F25D 29/00* (2006.01)
(Continued)

(52) U.S. Cl.
CPC ............ *F25D 23/028* (2013.01); *E05F 15/00* (2013.01); *E05F 15/635* (2015.01); *F25D 23/02* (2013.01);
(Continued)

(58) Field of Classification Search
CPC ...... F25D 23/028; F25D 23/02; F25D 29/005; H02P 6/17; H02P 6/16; H02P 29/10;
(Continued)

(56) References Cited

U.S. PATENT DOCUMENTS 7,496,939 B2 * 2/2009 Guo .................. F16H 35/10
720/664
10,260,797 B2 * 4/2019 Kim .................. H02P 6/16
(Continued)

FOREIGN PATENT DOCUMENTS

CN 101981398 2/2011
CN 202627785 12/2012
(Continued)

OTHER PUBLICATIONS

Chinese Office Action in Chinese Application No. 201680002368.9, dated Sep. 28, 2018, 19 pages (With English Translation).
(Continued)

*Primary Examiner* — Daniel J Rohrhoff
(74) *Attorney, Agent, or Firm* — Fish & Richardson P.C.

(57) ABSTRACT

According to an aspect of the present invention, there is provided a refrigerator including a cabinet in which a storage compartment is formed; a refrigerator door for opening and closing the storage compartment; a door opening device having a push rod which may move from an initial position to a door opening position for opening the refrigerator door and a motor for providing power to the push rod; and a controller controlling the motor, wherein the controller controls the push rod to move to the door opening position while in close contact with the cabinet or the refrigerator door in order to open the refrigerator door, and controls voltage supply to the motor so that a time period when the push rod is moved to the door opening position is maintained for a certain time.

14 Claims, 15 Drawing Sheets

Related U.S. Application Data continuation of application No. 15/570,873, filed as application No. PCT/KR2016/008417 on Jul. 29, 2016, now Pat. No. 10,260,797.

(51) Int. Cl.
| | |
|---|---|
| *H02P 6/16* | (2016.01) |
| *E05F 15/00* | (2015.01) |
| *E05F 15/635* | (2015.01) |
| *H02P 6/17* | (2016.01) |
| *H02P 29/10* | (2016.01) |

(52) U.S. Cl.
CPC ........... *F25D 29/00* (2013.01); *F25D 29/005* (2013.01); *H02P 6/16* (2013.01); *H02P 6/17* (2016.02); *H02P 29/10* (2016.02); *E05Y 2201/426* (2013.01); *E05Y 2201/686* (2013.01); *E05Y 2900/31* (2013.01); *F25D 2323/024* (2013.01); *F25D 2600/02* (2013.01)

(58) Field of Classification Search
CPC ......... E05Y 2201/426; E05Y 2201/686; E05Y 2900/31; E05Y 2600/02; E05F 15/611; E05F 15/619
See application file for complete search history.

(56) References Cited

U.S. PATENT DOCUMENTS

| | | | |
|---|---|---|---|
| 10,591,202 B2 * | 3/2020 | Kim | H02P 6/16 |
| 2008/0134698 A1 * | 6/2008 | Cho | F25D 23/028 |
| | | | 62/127 |
| 2009/0243454 A1 * | 10/2009 | Yoo | F25D 25/025 |
| | | | 312/405.1 |
| 2010/0141107 A1 * | 6/2010 | Kim | F25D 23/028 |
| | | | 312/405 |
| 2011/0043147 A1 * | 2/2011 | Lin | H02P 6/17 |
| | | | 318/400.06 |
| 2011/0048060 A1 * | 3/2011 | Kim | E05B 17/0029 |
| | | | 62/449 |
| 2011/0083461 A1 * | 4/2011 | Kim | F25D 23/028 |
| | | | 62/264 |
| 2015/0338156 A1 * | 11/2015 | Held | F25D 29/005 |
| | | | 312/405 |
| 2016/0223250 A1 | 8/2016 | Kang | |
| 2016/0312513 A1 * | 10/2016 | Heydel | E05F 15/614 |
| 2017/0191738 A1 | 7/2017 | Jung | |
| 2017/0321952 A1 * | 11/2017 | Jung | F25D 23/02 |
| 2017/0336132 A1 * | 11/2017 | Chang | F25D 23/02 |

FOREIGN PATENT DOCUMENTS

| | | |
|---|---|---|
| CN | 104457111 | 3/2014 |
| CN | 104121748 | 10/2014 |
| DE | 102008034809 | 1/2010 |
| EP | 2194347 | 6/2010 |
| JP | 2000258047 | 9/2000 |
| JP | 2000291333 | 10/2000 |
| JP | 2000324867 | 11/2000 |
| JP | 2001055863 | 2/2001 |
| JP | 2001101495 | 4/2001 |
| JP | 2006009400 | 1/2006 |
| JP | 2006023040 | 1/2006 |
| JP | 2008014549 | 1/2008 |
| JP | 2008101808 | 5/2008 |
| JP | 2008196743 | 8/2008 |
| JP | 2014214893 | 11/2014 |
| JP | 2015055437 | 3/2015 |
| KR | 20100022654 | 3/2010 |
| KR | 1020100064022 | 6/2010 |
| KR | 1020100126170 | 12/2010 |
| KR | 1020110040030 | 4/2011 |
| TW | 200945761 | 11/2009 |

OTHER PUBLICATIONS

Extended European Search Report in European Application No. 16801120.3, dated Feb. 2, 2018, 11 pages.
Machine translation of JP2000324867 (Year: 2018).
Japanese Notice of Allowance in Japanese Appln. No. 2019052228, dated Sep. 1, 2019, 7 pages (with English translation).
PCT International Search Report in International Appln. No. PCT/KR2016/008417, dated Feb. 2, 2017, 6 pages (with English translation).

\* cited by examiner

REFRIGERATOR

CROSS REFERENCE TO RELATED APPLICATIONS

This application is a continuation of U.S. application Ser. No. 16/260,756, filed on Jan. 29, 2019, now allowed, which is a continuation of U.S. application Ser. No. 15/570,873, filed on Oct. 31, 2017, now U.S. Pat. No. 10,260,797, which is the U.S. National Phase Application under 35 U.S.C. § 371 of International Application PCT/KR2016/008417, filed on Jul. 29, 2016, which claims the benefit of Korean Application No. 10-2015-0108162, filed on Jul. 30, 2015, and Korean Application No. 10-2015-0108163, filed on Jul. 30, 2015, the entire contents of which are hereby incorporated by reference in their entireties.

TECHNICAL FIELD

A refrigerator is disclosed herein.

BACKGROUND ART

In general, a refrigerator is a home electric appliance for keeping food and drink at a low temperature in an inner storage compartment shielded by a door.

A method for opening a refrigerator door has been disclosed in Korean Patent Application Publication No. 2011-0040030 (Publication Date: Apr. 20, 2011).

In the publication, a door handle is provided at the refrigerator door and a manipulation unit is provided at the door handle. And, a door opening device is provided at a cabinet forming a storage space. When a user operates the manipulation unit, a push rod configuring the door opening device pushes and opens the refrigerator door.

The push rod receives a driving force generated from a driving motor by a plurality of gears and performs a linear motion.

The push rod moves forward and may move to a set position for opening the door. And, in the case in which a position detecting member detects that the push rod moves to the set position, the driving motor is rotated reversely and the push rod is returned to its initial position.

According to the prior art document, since the driving motor constantly operates until the push rod moves to the set position, in the case in which an external force is applied to the refrigerator door in the process that the driving motor is operating, there is a problem that the push rod and the gears are broken or the driving motor is damaged due to overload of the driving motor.

Also, since the driving motor is constantly operating until the push rod moves to the set position regardless of the door opening by the user when the push rod is moving, in the case in which the user closes the door after increasing an opening angle of the door in the process of the push rod moving forward to the set position, a rotational force for closing the door is transmitted to the plurality of gears through the push rod, and thus there is a problem that the push rod and/or the gear are damaged.

DISCLOSURE

Technical Problem

The present invention is directed to providing a refrigerator in which a push rod and/or a gear for transmitting power to the push rod is prevented from being damaged by an action of an external load while the push rod for opening a door moves to a door opening position or while the push rod is moved to the door opening position, and a control method of the same.

The present invention is also directed to providing a refrigerator in which a door opening state may be maintained in a certain time while a push rod is moved to a door opening position, and a control method of the same.

The present invention is also directed to providing a refrigerator in which a door is prevented from being rattled in the process of opening the door, and a control method of the same.

The present invention is also directed to providing a refrigerator in which a push rod and/or a gear for transmitting power to the push rod is prevented from being damaged due to a door closed by a user while the push rod for opening the door moves to a door opening position or before the push rod returns to an initial position after moving to the door opening position, and a control method of the same.

Technical Solution

According to an aspect of the present invention, there is provided a refrigerator including a cabinet in which a storage compartment is formed; a refrigerator door for opening and closing the storage compartment; a door opening device having a push rod which may move from an initial position to a door opening position for opening the refrigerator door and a motor for providing power to the push rod; and a controller controlling the motor, wherein the controller controls the push rod to move to the door opening position while in close contact with the cabinet or the refrigerator door in order to open the refrigerator door, and controls voltage supply to the motor so that a time period in which the push rod is moved to the door opening position is maintained for a certain time.

The push rod may include an arc-shaped rack gear which may receive power of the motor.

The controller may supply a voltage to the motor so that the motor is rotated in a first direction in order to move the push rod from the initial position to the door opening position.

The controller may control the motor so that a rotational speed of the motor is reduced in the process that the push rod moves from the initial position to the door opening position.

The controller may control the motor so that the motor rotates in a first rotational speed and may control the motor so that the rotational speed of the motor becomes a second rotational speed which is lower than the first rotational speed at a certain point of time.

When the rotational speed of the motor reaches to the second rotational speed, the controller may control the motor so that the rotational speed of the motor is maintained in the second rotational speed until the push rod reaches to the door opening position.

The refrigerator may further include a motor rotation detecting portion for detecting the rotation of the motor, wherein the motor rotation detecting portion may output a pulse in the rotation process of the motor, and the certain point of time may be a point of time when the number of pulses output from the motor rotation detecting portion reaches to a first reference number.

The speed of the motor at a point of time when the number of the pulses output from the motor rotation detecting portion reaches to a second reference number which is larger than the first reference number may be the second rotational speed.

The refrigerator may further include a motor rotation detecting portion for detecting the rotation of the motor, wherein while the motor is rotated in one direction for opening the refrigerator door and the push rod moves from the initial position to the door opening position, the controller may determine whether an external load is acting on the refrigerator door in a direction in which the refrigerator door is closed based on information detected from the motor rotation detecting portion.

When it is determined that the external load acts on the refrigerator door, the motor may be rotated in the other direction so that the push rod returns to the initial position.

The motor rotation detecting portion may output a pulse in the rotation process of the motor, and in the case in which the number of pulses to be output per unit time in the motor rotation detecting portion is equal to or less than the number of detected loads, the controller may rotate the motor in the other direction so that the push rod returns to the initial position.

When the push rod reaches to the door opening position, the controller may stop the motor, and while the push rod reaches to the door opening position, the controller may determine whether the external load acts on the refrigerator door in the direction in which the refrigerator door is closed based on the information detected from the motor rotation detecting portion.

When it is determined that the external load acts on the refrigerator door, the motor may be rotated in the other direction so that the push rod returns to the initial position.

The controller may stop the motor when the push rod moves to the door opening position, and may supply a voltage to the motor so that the push rod is maintained in a suspended state at the door opening position.

The refrigerator may further include a motor rotation detecting portion detecting the rotation of the motor, wherein when the motor is rotated, a pulse may be output from the motor rotation detecting portion, and the controller may control a period of the voltage supplied to the motor such that the pulse is not output from the motor rotation detecting portion.

When a certain time elapses from a point of time when the rotation of the motor is stopped, the controller may rotate the motor in the other direction so that the push rod returns from the door opening position to the initial position.

The refrigerator may further include a door opening detecting portion for detecting whether the refrigerator door is opened at equal to or more than a reference angle, wherein when the door opening detecting portion detects that the refrigerator door is opened at equal to or more than the reference angle before the push rod returns to the initial position, the controller may control the motor so that the push rod returns to the initial position.

The refrigerator door may include a first refrigerator door and a second refrigerator door deposed in a right and left direction. While the push rod is moved to the door opening position, at least a portion of a rear surface of an opened refrigerator door of the first refrigerator door and the second refrigerator door may be positioned forward than a front surface of a closed refrigerator door of the first refrigerator door and the second refrigerator door.

According to another aspect of the present invention, there is provided a refrigerator including a cabinet in which a storage compartment is formed; a refrigerator door for opening and closing the storage compartment; a door opening device having a push rod which may move from an initial position to a door opening position for opening the refrigerator door and a motor for providing power to the push rod; and a controller controlling the motor, wherein the controller controls the motor so that a rotational speed of the motor is reduced in the process that the push rod moves from the initial position to the door opening position in order to open the refrigerator door.

The controller may control the motor so that the motor rotates in a first rotational speed and may control the motor so that the rotational speed of the motor becomes a second rotational speed lower than the first rotational speed at a certain point of time.

The controller may control the motor so that the rotational speed of the motor is linearly or non-linearly reduced from the first rotational speed to the second rotational speed.

When the rotational speed of the motor reaches to the second rotational speed, the controller may control the motor so that the rotational speed of the motor is maintained in the second rotational speed until the push rod reaches to the door opening position.

The refrigerator may further include a motor rotation detecting portion for detecting the rotation of the motor.

The motor rotation detecting portion outputs a pulse in the rotation process of the motor, and the certain point of time may be a point of time when the number of the pulses output from the motor rotation detecting portion reaches to a first reference number.

The speed of the motor at a point of time when the number of the pulses output from the motor rotation detecting portion reaches to a second reference number which is larger than the first reference number is the second rotational speed.

The refrigerator may further include a motor rotation detecting portion for detecting the rotation of the motor.

While the motor operates in one direction for opening the refrigerator door and the push rod moves to the door opening position from the initial position, the controller may determine whether an external load is acting on the refrigerator door in a direction in which the refrigerator door is closed based on information detected from the motor rotation detecting portion.

When it is determined that the external load acts on the refrigerator door, the controller may rotate the motor in the other direction so that the push rod returns to the initial position.

The motor rotation detecting portion may output the pulse in the rotation process of the motor, and in the case in which the number of pulses output per unit time in the motor rotation detecting portion is equal to or less than the number of detected loads, the controller may rotate the motor in the other direction so that the push rod returns to the initial position.

The controller may determine whether the external load acts on the refrigerator door after the motor is rotated in one direction and a reference time elapses.

The controller may stop the motor when the push rod reaches to the door opening position.

While the push rod reaches to the door opening position, the controller may determine whether the external load acts on the refrigerator door in the direction in which the refrigerator door is closed based on the information detected from the motor rotation detecting portion.

When it is determined that the external load acts on the refrigerator door, the motor may be rotated in the other direction so that the push rod returns to the initial position.

According to still another aspect of the present invention, there is provided a refrigerator including a cabinet in which a storage compartment is formed; a refrigerator door for opening and closing the storage compartment; a door opening device having a push rod which may move from an initial position to a door opening position for opening the refrigerator door and a motor for providing power to the push rod; a motor rotation detecting portion for detecting rotation of the motor; and a controller controlling the motor.

While the motor operates in one direction for opening the refrigerator door and the push rod moves to the door opening position from the initial position, the controller may determine whether an external load is acting on the refrigerator door in a direction in which the refrigerator door is closed based on information detected from the motor rotation detecting portion.

When it is determined that the external load acts on the refrigerator door, the motor may be rotated in the other direction so that the push rod returns to the initial position.

The motor rotation detecting portion may output a pulse in the rotation process of the motor, and in the case in which the number of pulses output per unit time in the motor rotation detecting portion is equal to or less than the number of detected loads, the controller may rotate the motor in the other direction so that the push rod returns to the initial position.

The controller may determine whether the external load acts on the refrigerator door after the motor is rotated in one direction and a reference time elapses.

When the push rod reaches to the door opening position, the controller may stop the motor, and while the push rod reaches to the door opening position, the controller may determine whether the external load acts on the refrigerator door in the direction in which the refrigerator door is closed based on the information detected from the motor rotation detecting portion.

When it is determined that the external load acts on the refrigerator door, the controller may rotate the motor in the other direction so that the push rod returns to the initial position.

The motor rotation detecting portion may output the pulse in the rotation process of the motor, and in the case in which the number of pulses output per unit time in the motor rotation detecting portion is equal to or more than the number of detected loads, the controller may rotate the motor in the other direction so that the push rod returns to the initial position.

According to yet another aspect of the present invention, there is provided a refrigerator including a cabinet in which a storage compartment is formed; a refrigerator door for opening and closing the storage compartment; a door opening device having a push rod which may move from an initial position to a door opening position for opening the refrigerator door and a motor for providing power to the push rod; and a controller controlling the motor, wherein the controller rotates the motor in one direction so that the push rod moves from the initial position to the door opening position in order to open the refrigerator door.

When the push rod reaches to the door opening position, the controller may stop the rotation of the motor and may supply a voltage to the motor so that the motor is prevented from being rotated in the other direction.

The refrigerator may further include a motor rotation detecting portion detecting the rotation of the motor, wherein when the motor is rotated, a pulse is output from the motor rotation detecting portion, and the controller may control a period of the voltage supplied to the motor such that the pulse is not output from the motor rotation detecting portion.

When a certain time elapses from a time when the rotation of the motor is stopped, the controller may rotate the motor in the other direction so that the push rod returns from the door opening position to the initial position.

According to yet another aspect of the present invention, there is provided a refrigerator including a cabinet in which a storage compartment is formed; a refrigerator door for opening and closing the storage compartment; a door opening device having a push rod which may move between an initial position and a door opening position for opening and closing the refrigerator door and a motor for providing power to the push rod; a door opening detecting portion for detecting whether the door is opened at equal to or more than a reference angle; and a controller controlling the motor based on information detected from the door opening detecting portion.

When the door opening detecting portion detects that the refrigerator door is opened at equal to or more than the reference angle before the push rod returns to the initial position, the controller may control the motor so that the push rod returns to the initial position.

The reference angle may be larger than an opening angle of the refrigerator door while the push rod moves to the door opening position.

When the door opening detecting portion detects that the refrigerator door is opened at equal to or more than the reference angle while the push rod moves from the initial position to the door opening position, the controller may control the motor so that the push rod returns to the initial position.

When the push rod reaches to the door opening position, the motor may be stopped, and when a certain time elapses while the push rod is moved to the door opening position and the motor is stopped, the controller may control the motor so that the push rod returns from the door opening position to the initial position.

When the door opening detecting portion detects that the refrigerator door is opened at equal to or more than the reference angle before the certain time elapses while the push rod is moved to the door opening position and the motor is stopped, the controller may control the motor so that the push rod returns to the initial position.

The refrigerator may further include a hinge assembly having a hinge shaft for connecting the cabinet and the refrigerator door, wherein the door opening detecting portion may include a sensor outputting a signal and located adjacent to the hinge shaft.

The door opening detecting portion may further include a magnet provided in any one of the hinge assembly and the refrigerator door. The sensor may be a magnetic sensor detecting a magnetic of the magnet, and may be provided in the other one of the hinge assembly and the refrigerator door.

The door opening detecting portion may further include a magnet provided in any one of the hinge assembly and the refrigerator door.

The sensor may be a magnet sensor which is turned on by magnet when the refrigerator door is opened at less than the reference angle and which is turned off when the refrigerator door is opened at equal to or more than the reference angle, and may be provided in the other one of the hinge assembly and the refrigerator door.

The sensor may be a micro switch provided in any one of the hinge assembly and the refrigerator door.

The door opening detecting portion may further include a switch control portion provided in the other one of the hinge assembly and the refrigerator door and turning on the micro switch when the refrigerator door is opened by the reference angle.

The sensor may include a light emitting portion and a light receiving portion, and when the refrigerator door rotates at the reference angle, light irradiated from the light emitting portion reaches to the light receiving portion, and when the light reaches to the light receiving portion, the controller may determine that the refrigerator door is opened by the reference angle.

The light emitting portion and the light receiving portion may be disposed in any one of the refrigerator door and the hinge assembly.

The light emitting portion may be disposed in any one of the refrigerator door and the hinge assembly, and the light receiving portion may be disposed in the other one of the refrigerator door and the hinge assembly.

According to yet another aspect of the present invention, there is provided a control method of a refrigerator including a step in which a motor operates in one direction and a push rod moves from an initial position to a door opening position for opening a refrigerator door; and a step in which whether a certain time elapses after the push rod reaches to the door opening position is determined; and a step in which, when it is determined that the certain time elapses, the motor operates in the other direction so that the push rod returns to the initial position.

The rotational speed of the motor may be controlled so that a one directional rotational speed of the motor is reduced in the process that the push rod moves from the initial position to the door opening position.

The rotational speed of the motor may be controlled so that the one directional rotational speed of the motor is reduced for a certain time until when the speed is maintained at a first rotational speed and reaches to a second rotational speed which is lower than the first rotational speed.

A step to move from the initial position to the door opening position may include a step in which the controller determines whether an external load acts on the refrigerator door in a direction in which the refrigerator door is closed, and a step in which, when it is determined that the external load acts on the refrigerator door, the controller rotates the motor in the other direction so that the push rod returns to the initial position even before reaching to the door opening position.

When the push rod reaches to the door opening position, the controller may supply a voltage to the motor so that the rotation of the motor in the other direction is prevented.

In the case in which the push rod reaches to the door opening position, the controller may determine whether the external load acts on the refrigerator door in the direction in which the refrigerator door is closed, and when it is determined that the external load acts on the refrigerator door, the controller may rotate the motor in the other direction so that the push rod returns to the initial position.

According to yet another aspect of the present invention, there is provided a control method of a refrigerator including a step in which a push rod moves from an initial position to a door opening position by an operation of a motor for opening a refrigerator door; a step in which a controller determines whether the opening of the refrigerator door is detected at a door opening detecting portion before the push rod reaches from the initial position to the door opening position; and a step in which the controller controls the motor based on whether the opening of the refrigerator door is detected at the door opening detecting portion.

A step in which the controller controls the motor may include a step in which the controller controls the motor so that the push rod returns to the initial position when the door opening detecting portion determines that the refrigerator door is opened before the push rod reaches to the door opening position.

A step in which the controller controls the motor may include a step in which the controller controls the motor so that the push rod reaches to the door opening position when the door opening detecting portion determines that the refrigerator door is not opened before the push rod reaches to the door opening position.

According to yet another aspect of the present invention, there is provided a control method of a refrigerator including a step in which a motor operates for opening a refrigerator door and a push rod moves from an initial position to a door opening position; a step in which a controller determines whether the opening of the refrigerator door is detected at a door opening detecting portion while the push rod is stopped at the door opening position; and a step in which the controller controls the motor based on whether the opening of the refrigerator door is detected at the door opening detecting portion.

A step in which the controller controls the motor may include a step in which the controller controls the motor so that the push rod returns to the initial position when the door opening detecting portion determines that the refrigerator door is opened before a certain time elapses while the push rod is stopped at the door opening position.

A step in which the controller controls the motor may include a step in which the controller controls the motor so that the push rod returns to the initial position when the door opening detecting portion determines that the opening of the refrigerator door is not detected until a certain time elapses while the push rod is stopped at the door opening position.

Advantageous Effects

According to the proposed invention, when it is detected that an external load acts on a door in a direction in which the door is closed in the moving process of a push rod for door opening, as a motor is controlled so that the push rod returns to an initial position, a damage of the push rod and/or a gear is prevented, and a damage of the motor due to an overload of the motor may be prevented.

Also, as a voltage is supplied to the motor while the push rod moves to a door opening position, the push rod moves to the initial position by any one of a weight of the door itself, a magnetic force of a magnet provided in a gasket for the close contact of the door and a cabinet, and a closing force due to an auto-close mechanism for closing the door automatically, and thus a phenomenon in which the push rod moves to the initial position and the door is closed may be prevented.

Also, the rotational speed of the motor is reduced in the process that the push rod moves from the initial position to the door opening position, and accordingly, a moving speed of the push rod is reduced, and since the push rod stops at the door opening position while the moving speed of the push rod is reduced, a rattling phenomenon is prevented in the opening process of the door, and the rotation of a first refrigerator door may be stopped smoothly.

Also, as it is detected that the door is opened at equal to or more than a reference angle larger than an opening angle of the door when the push rod moves to the door opening position, and as the push rod returns to the initial position, the push rod or the gear for transmitting power to the push rod may be prevented from being damaged by the door being closed before the push rod returns to the initial position.

Also, as a door opening detecting portion is positioned adjacent to a hinge shaft, there is an advantage that it is possible to accurately detect that the door is rotated by equal to or more than the reference angle.

Also, as the door opening detecting portion is positioned adjacent to the hinge shaft, an interference with other configuration such as a door opening device may be prevented.

Also, in the case in which a portion of the door opening detecting portion is provided in a hinge assembly, it is easy to assemble the door opening detecting portion, and since it is easy to access the door opening detecting portion by separating the hinge assembly, there is an advantage that a service of the door opening detecting portion is easy.

MODES OF THE INVENTION

Figure 1:
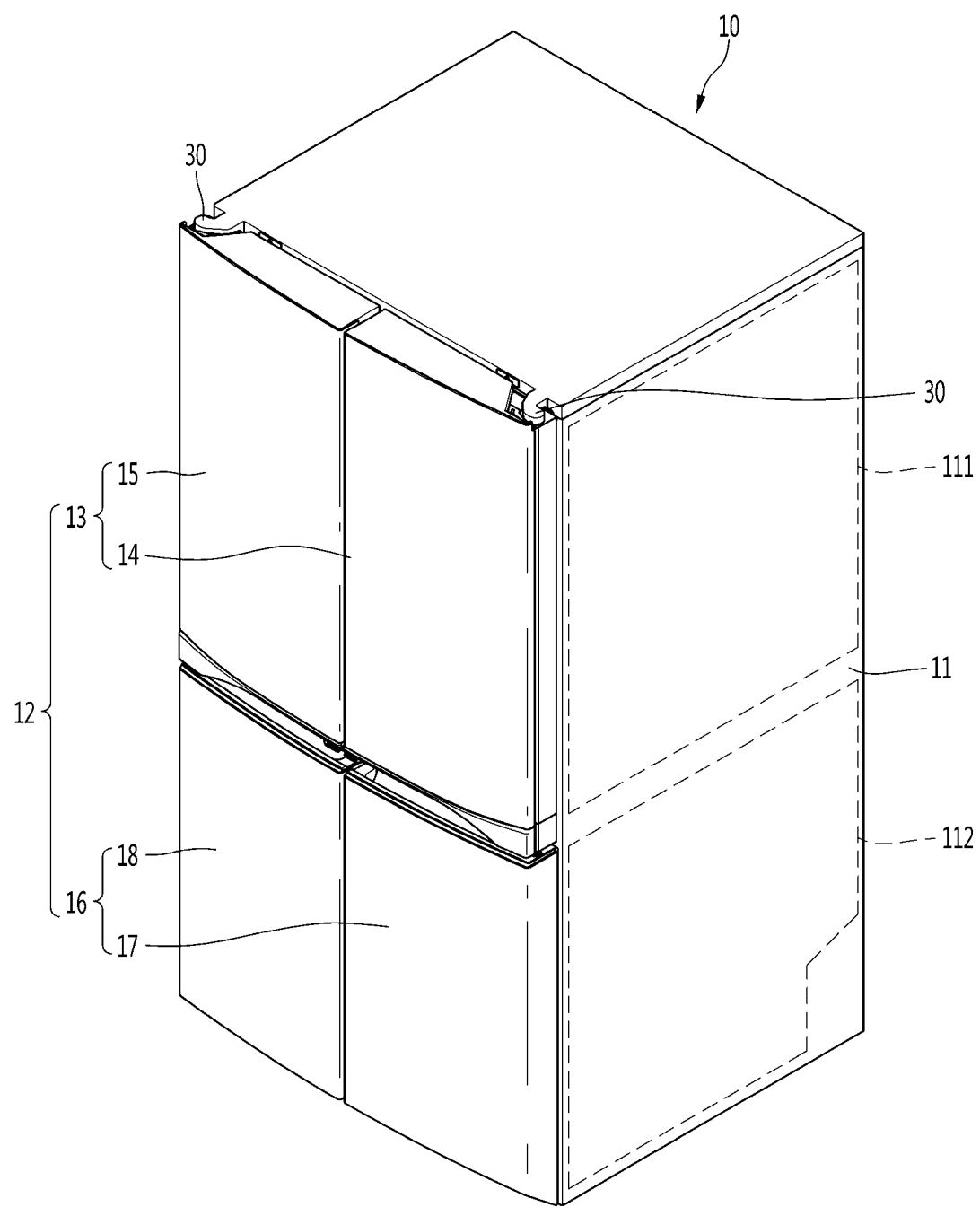
FIG. 1 is a perspective view of a refrigerator according to a first embodiment of the present invention.

Hereinafter, some embodiments of the present invention will be described in detail with reference to the accompanying illustrative drawings. In giving reference numerals to components of the drawings, the same reference numerals are given to the same components. Also, in the following description of the present invention, if a detailed description of known functions and configurations is determined to obscure the interpretation of embodiments of the present invention, the detailed description thereof will be omitted.

Further, in explaining the components of the embodiment of the present invention, a first, a second, A, B, (a), (b), and the like can be used. These terms are intended to distinguish one component from other components, but the nature and the order or sequence of the components is not limited by those terms. When components are disclosed as "connected," "coupled" or "contacted" to other components, the component can be directly connected or contacted to the other components, but it should be understood that another component(s) could be "connected," "coupled" or "contacted" there between.

Figure 2:
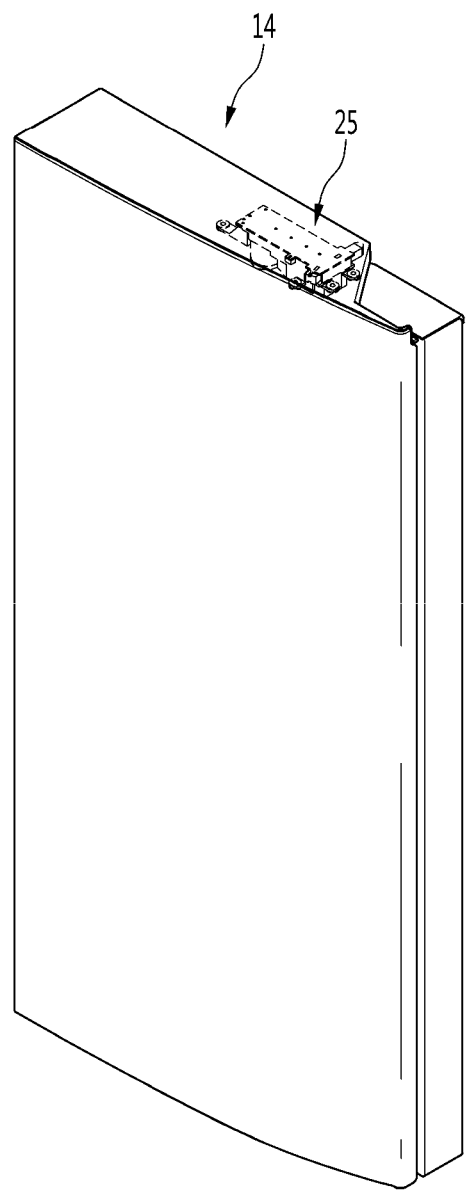
FIG. 2 is a perspective view illustrating a door opening device provided at a first refrigerating compartment door according to the first embodiment of the present invention.
Figure 3:
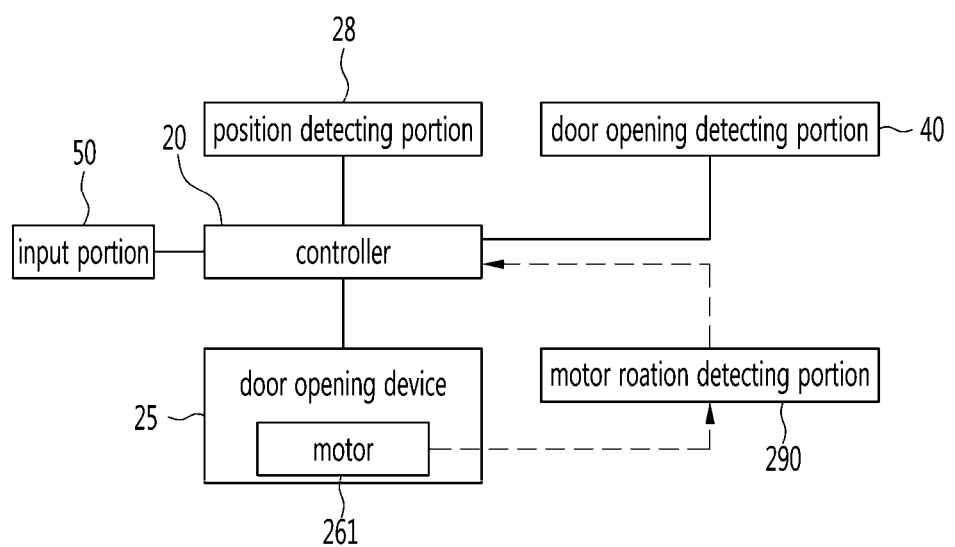
FIG. 3 is a block diagram of the refrigerator according to the first embodiment of the present invention.

FIG. 1 is a perspective view of a refrigerator according to a first embodiment of the present invention, FIG. 2 is a perspective view illustrating a door opening device provided at a first refrigerating compartment door according to the first embodiment of the present invention, and FIG. 3 is a block diagram of the refrigerator according to the first embodiment of the present invention.

With reference to FIGS. 1 to 3, a refrigerator 10 according to a first embodiment of the present invention may include a cabinet 11 provided with a storage compartment therein, and a refrigerator door 12 rotatably or slidably connected to a front surface of the cabinet and selectively opens and closes the storage compartment.

In particular, the storage compartment may include one or more of a refrigerating compartment 111 and a freezing compartment 112.

The refrigerating compartment 111 may be opened and closed by a refrigerating compartment door 13, and the freezing compartment 112 may be selectively opened and closed by a freezing compartment door 16.

Also, in the case in which the refrigerating compartment door 13 opening and closing the refrigerating compartment 111 is a rotary-type door, the refrigerating compartment door 13 may include a pair of doors 14 and 15 which are rotatably connected to each of a front left edge and a front right edge of the cabinet 11. That is, the refrigerating compartment door 13 may include a first refrigerating compartment door 14 and a second refrigerating compartment door 15.

In the case in which the freezing compartment door 16 opening and closing the freezing compartment 112 is a rotary-type door, the freezing compartment door 16 may include a pair of doors 17 and 18 which are rotatably connected to each of the front left edge and the front right edge of the cabinet 11.

Also, in the case in which the freezing compartment door 16 is a drawer-type door opening and closing the freezing compartment 112 in a sliding manner, a plurality of freezing compartment doors 16 may be arranged in a vertical direction or a horizontal direction.

The refrigerator 10 may further include a door opening device 25 operating for opening the refrigerator door 12.

Hereinafter, an example in which the door opening device 25 automatically opens the first refrigerating compartment door 14 of the refrigerator door 12 will be described, and the other door except the first refrigerating compartment door 14 may be automatically opened by a structure and a method described below.

The door opening device 25 may be disposed at a door needed to be opened. In one example, the door opening device 25 may be provided at each of a plurality of refrigerating compartment doors for opening each of the plurality of refrigerating compartment doors. Also, in the case in which one refrigerating compartment door includes a plurality of doors, the door opening device 25 may be provided at one or all doors among the plurality of doors.

At this point, the door opening device 25 may be positioned at an upper side portion of the door needed to be opened.

Also, the door opening device 25 may be provided at the freezing compartment door 16 for opening the freezing compartment door 16.

In another example, the door opening device 25 may be provided in the cabinet 11. At this time, the door opening device 25 may be provided in the same number with the number of the refrigerator doors 12.

Also, in the present embodiment, only a bottom freezer type refrigerator is disclosed, but the spirit for door opening may be applied to various refrigerators such as a top mount type refrigerator, a side by side type refrigerator, and a refrigerator having only a single storage compartment and a door, etc.

The first refrigerating compartment door 14 may be connected to the cabinet 11 by a hinge assembly 30. The first refrigerating compartment door 14 may be rotated by a hinge shaft (referring to 32 of FIG. 4) providing a center of rotation. The hinge shaft 32 of FIG. 4 may be provided in the first refrigerating compartment door 14 and/or the hinge assembly 30.

Figure 4:
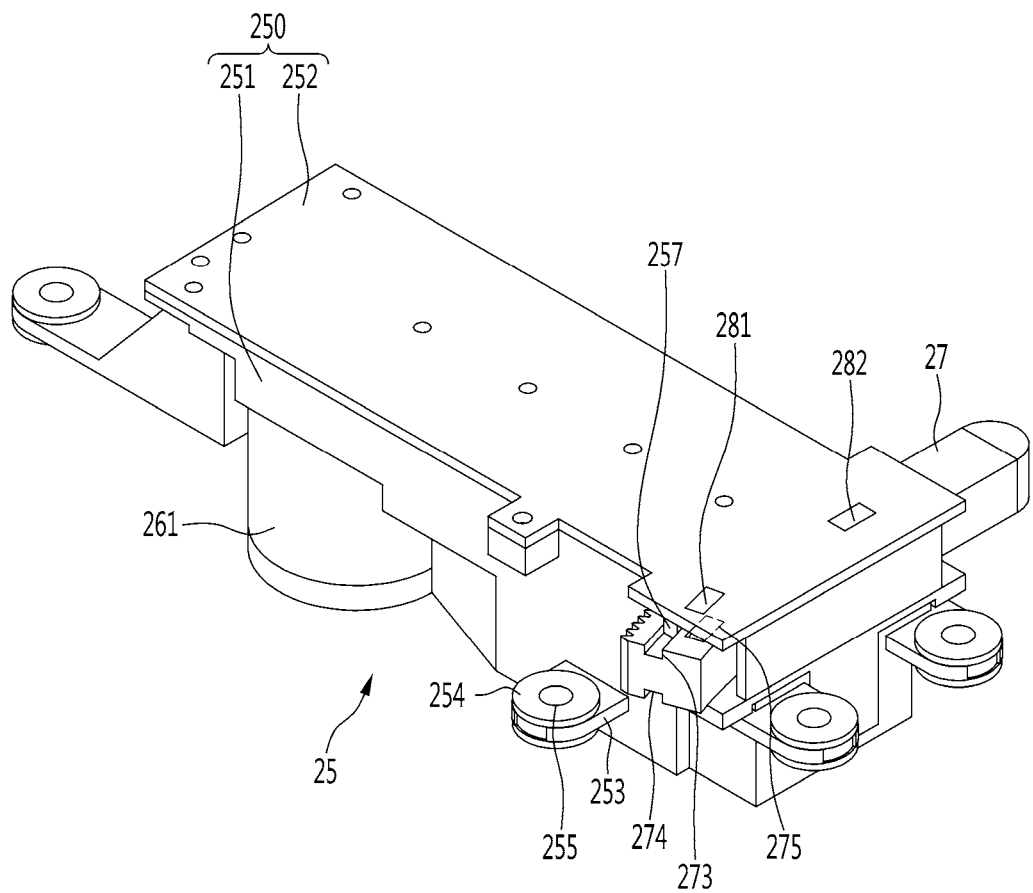
FIG. 4 is a view illustrating the door opening device according to the first embodiment of the present invention.

The refrigerator 10 may further include a position detecting portion 28 for detecting a position of a push rod (referring to 27 of FIG. 4) configuring the door opening device 25, and a motor rotation detecting portion 290 detecting a rotation of a motor 261 generating power for operating the push rod 27 of FIG. 4, and a controller 20 controlling the door opening device 25 based on information detected from the position detecting portion 28 and the motor rotation detecting portion 290.

Also, the refrigerator 10 may further include a door opening detecting portion 40 for detecting whether the door is opened at equal to or more than a reference angle, and the controller 20 may control the door opening device 25 based on information detected from the door opening detecting portion 40.

A control of the door opening device 25 by the controller 20 is described later.

The refrigerator 10 may further include an input portion 50 for inputting a door opening command. The input portion 50 may be various such as a switch turned on by a contact of a user, or a touch screen receiving a command of the user, or a sensor detecting a gesture of the user, and a structure and a method for imputing the door opening command are not limited in the present invention.

Hereinafter the door opening device 25 will be described in detail.

Figure 5:
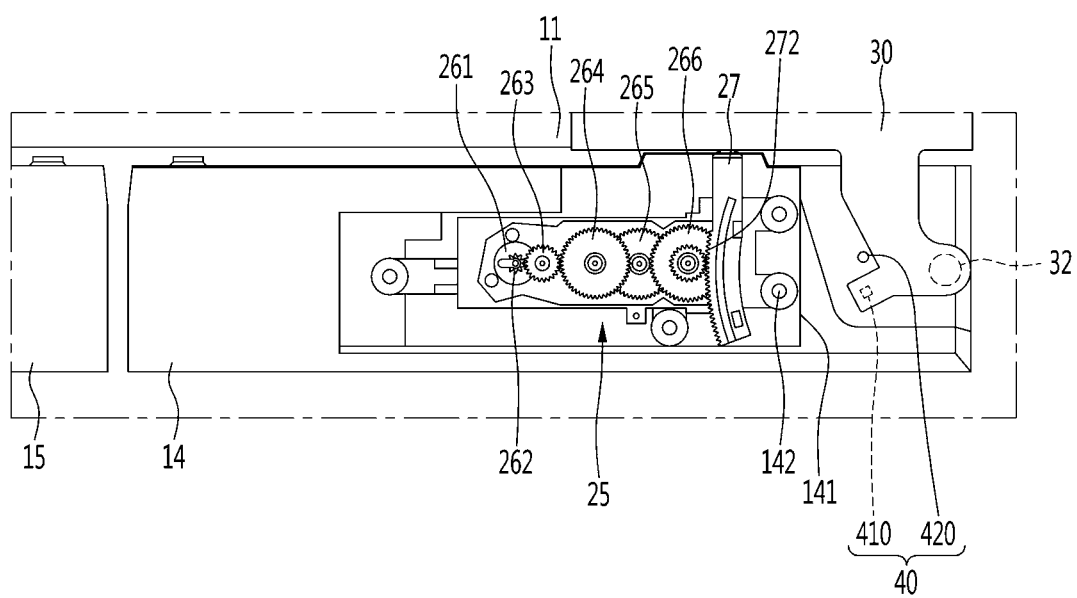
FIG. 5 is a plan view illustrating the door opening device installed in the first refrigerating compartment door according to the first embodiment of the present invention.

FIG. 4 is a view illustrating the door opening device according to the first embodiment of the present invention, and FIG. 5 is a plan view illustrating the door opening device installed in the first refrigerating compartment door according to the first embodiment of the present invention.

With reference to FIGS. 4 to 5, the door opening device 25 may be positioned on an upper side portion of the first refrigerating compartment door 14. A frame 141 forming a space for accommodating the door opening device 25 may be provided in the upper side portion of the first refrigerating compartment door 14. The frame 141 may partition a space in which an insulating material (not shown) is accommodated and a space in which the door opening device 25 is accommodated in the first refrigerating compartment door 14.

In another example, the door opening device 25 may be positioned on a lower side portion of the first refrigerating compartment door 14.

The door opening device 25 may include a housing 250 accommodated inside the frame 141, a motor 261 installed in the housing 250 and generating a driving force, a push rod 27 operating by receiving the driving force of the motor 261, and a power transmitting mechanism transmitting the driving force of the motor 261 to the push rod 27.

There is no limit but, the housing 250 may include a first housing 251, and a second housing 252 coupled with the first housing 251.

A coupling portion 253 coupled with a buffer portion 254 which may absorb shock or vibration may be provided in the first housing 251. The buffer portion 254 has a hole 255, and an installing portion 142 which may be inserted into the hole 255 of the buffer portion 254 may be provided in the frame 141.

As the door opening device 25 is coupled to the frame 141 by the buffer portion 254, a vibration generated when the motor 261 is operated and a vibration generated when the power transmitting mechanism is operated are absorbed and a noise may be reduced, and the motor 261 and the power transmitting mechanism may be prevented from transmitting the vibrations to the first refrigerating compartment door 14.

The power transmitting mechanism may include one or more gears 262, 263, 264, 265 and 266.

In the present invention, there is no limit on the number of gears as long as the power transmitting mechanism may transmit power of the motor 261 to the push rod 27, and in one example, the power transmitting mechanism is disclosed to include a plurality of gears 262, 263, 264, 265 and 266 in FIG. 5.

In the case in which the push rod 27 is positioned in the first refrigerating compartment door 14, a length of the push rod 27 is limited but, the push rod 27 may include a curve-shaped rack gear 272 for securing an opening angle of the first refrigerating compartment door 14 by the push rod 27. At this time, the rack gear 272 may be engaged with a last gear of the plurality of gears 262, 263, 264, 265 and 266.

As the rack gear 272 is formed in a curved shape, the length of the push rod 27 may be reduced when the first refrigerating compartment door 14 is to be opened by a required angle.

Therefore, even the push rod 27 is disposed on the first refrigerating compartment door 14, the opening of the first refrigerating compartment door 14 is available by the push rod 27, and the opening angle may be increased than a linearly shaped rack gear.

As the rack gear 272 is formed in a curved shape, the push rod 27 may rotate relatively with a last gear when the last gear of the plurality of gears 262, 263, 264, 265 and 266 is rotated.

That is, when the motor 261 is operated, the push rod 27 not only may rotate with the first refrigerating compartment door 14 about the hinge shaft 32, but also rotate about the plurality of gears 262, 263, 264, 265 and 266 and consequently may perform a relative curved motion about the first refrigerating compartment door 14.

The rack gear 272 may be formed in an arc shape. At this time, the rack gear 272 may be disposed to be convex in a direction away from the hinge shaft 32.

When the push rod 27 performs the relative curved motion about the first refrigerating compartment door 14, a center of the curve-shaped rack gear 272 may coincide with the hinge shaft 32 so that the push rod 27 may maintain a contact state with a front surface of the cabinet 11.

One or more guide ribs 257 are provided in any one of the housing 250 and the push rod 27 so that the push rod 27 may move safely, and one or more guide grooves 273 and 274 in which the one or more guide ribs 257 are accommodated may be provided in the other one the housing 250 and the push rod 27.

At this time, the one or more guide ribs 257 and the one or more guide grooves 273 and 274 are may be formed in a curved shape. Or, the one or more guide ribs 257 may be formed in a circular or rectangular shape, and the one or more guide grooves 273 and 274 may be formed in a curved shape.

In one example, in FIG. 4, the one or more guide ribs 257 are provided in the housing 250, and the one or more guide grooves 273 and 274 are disclosed to be provided in the push rod 27.

There is no limit, but each of the guide grooves 273 and 274 may be provided on a first surface (an upper surface based on the figure) and a second surface (a lower surface based on the figure) facing the first surface, and the guide rib 257 may be provided in each of the first housing 251 and the second housing 252.

The guide grooves 273 and 274 may be formed in an arc shape. At this time, the guide grooves 273 and 274 may be disposed to convex in a direction away from the hinge shaft 32. And a center of the arc of the guide grooves 273 and 274 may be the hinge shaft 32.

Meanwhile, the push rod 27 may be positioned adjacent to the hinge shaft 32. The more the push rod 27 is positioned adjacent to the hinge shaft 32, the door opening device 25 is simplified and compact and the length of the push rod 27 may be reduced.

The hinge shaft 32 may be positioned on an upper surface of the first refrigerating compartment door 14. The first refrigerating compartment door 14 may include a first side surface 14a and a second side surface 14b facing the first side surface 14a, and the hinge shaft 32 may be positioned close to the first side surface 14a.

That is, based on an imaginary line L bisecting the distance between the first side surface 14a and the second side surface 14b, the hinge shaft 32 may be positioned in an area corresponding to an area between the imaginary line L and the first side surface 14a.

And, the push rod 27 may be positioned between the motor 261 and the hinge shaft 32. Also, the push rod 27 may be positioned in the area corresponding to the area between the imaginary line L and the first side surface 14a. At this time, the push rod 27 may be positioned between the imaginary line L and the hinge shaft 32.

Therefore, according to the present invention, as the push rod 27 is positioned adjacent to the hinge shaft 32, the opening angle of the first refrigerating compartment door 14 may be increased by using a short push rod 27.

By the one directional rotation of the motor 261, the plurality of gears 262, 263, 264, 265 and 266 are rotated in a normal direction, and accordingly, the push rod 27 may move in a direction in which the push rod 27 is withdrawn from the first refrigerating compartment door 14 for opening the door.

On the other hand, by the other directional rotation of the motor 261, the plurality of gears 262, 263, 264, 265 and 266 are rotated in a reverse direction, and the push rod 27 may be inserted into the first refrigerating compartment door 14.

At this time, during the opening process of the door or after the door is opened, before the push rod 27 returns to an initial position, each of the plurality of gears 262, 263, 264, 265 and 266 may be a spur gear so that each of the plurality of gears 262, 263, 264, 265 and 266 may be rotated in the reverse direction by an external force applied to the push rod 27.

Therefore, even the external force is applied to the push rod 27, the plurality of gears 262, 263, 264, 265 and 266 may be rotated in the reverse direction, and thus there is an advantage that a damage of the plurality of gears 262, 263, 264, 265 and 266 and the push rod 27 may be prevented.

Or, a portion or all of the plurality of gears 262, 263, 264, 265 and 266 may be a multiple end spur gear having two gear bodies which have different diameters.

Meanwhile, the position detecting portion 28 may include a first position sensor 281 and a second position sensor 282. In one example, the first position sensor 281 and the second position sensor 282 may be disposed in the housing 250.

And, a magnet 275 may be provided in the push rod 27. The first position sensor 281 and the second position sensor 282 may be a magnetic detecting sensor for detecting a magnetic of the magnet 275.

In the present document, a position of the push rod 27 when the first position sensor 281 detects the magnet 275 or a position of the push rod 27 when the first position sensor 281 faces the magnet 275 may be an initial position.

A position of the push rod 27 when the second position sensor 282 detects the magnet 275 or a position of the push rod 27 when the second position sensor 282 faces the magnet 275 may be a door opening position (or a final position).

In the present embodiment, the first refrigerating compartment door 14 may be opened in the process that the push rod 27 moves from the initial position to the door opening position.

In the present document, "door opens" means that the storage compartment opened and closed by the door is communicated with outside the refrigerator 10.

The controller 20 may control the motor 261 based on information detected from each of the position sensors 281 and 282. In one example, the controller 20 may rotate the motor 261 in one direction and may stop the motor 261 when it is detected that the push rod 27 moves to the door opening position.

When the push rod 27 is moved to the door opening position and a certain time elapses while the motor 261 is stopped, the controller 20 may rotate the motor 261 in the other direction so that the push rod 27 returns to the initial position.

According to the present embodiment, the reason for rotating the motor 261 in the other direction after the motor is stopped and then a certain time elapses is to maintain a state in which the first refrigerating compartment door 14 is opened.

That is, in the case in which the push rod 27 moves to the door opening position and immediately returns to the initial position without maintaining the suspended state, a problem that the first refrigerating compartment door 14 is closed immediately occurs by one or more of weight of the first refrigerating compartment door 14 itself (including the weight of food stored in the first refrigerating compartment door 14), a magnetic force provided in a gasket (not shown) for the close contact of the first refrigerating compartment door 14 and the cabinet 11, and a closing force by an auto-close mechanism (not shown) provided in the hinge assembly 30 for the door to be closed automatically.

However, like the present invention, in the case in which the motor 261 is rotated in the other direction after the motor 261 is stopped and then a certain time elapses, since the first refrigerating compartment door 14 may maintain a opened state during the certain time, the user may easily increase the opening angle of the first refrigerating compartment door 14 manually.

In another example, the first position sensor 281 and the second position sensor 282 may be a light sensor. And, a groove or a projection portion may be provided in the push rod 27 and each of the position sensors 281 and 282 may detect the groove or the projection portion. A configuration for detecting a position of the push rod 27 is not limited in the present embodiment.

Meanwhile, the door opening detecting portion 40 may include a magnet 420 provided in any one of the first refrigerating compartment door 14 and the hinge assembly 30, and a detecting sensor 410 provided in the other one of the first refrigerating compartment door 14 and the hinge assembly 30 and detecting a magnetic of the magnet 420.

In one example, in FIG. 5, the detecting sensor 410 is disclosed to be disposed in the hinge assembly 30.

In the case in which the detecting sensor 410 is provided in the hinge assembly 30, an assembly and service of the detecting sensor 410 may be easy. That is, the detecting sensor 410 may be accessed by separating the hinge assembly 30, without separating the first refrigerating compartment door 14.

The detecting sensor 410 and the magnet 420 may be disposed adjacent to the hinge shaft 32. Therefore, in the rotating process of the first refrigerating compartment door 14, the detecting sensor 410 may detect the magnetic of the magnet 420 of the first refrigerating compartment door 14 directly, and thus may accurately detect that the first refrigerating compartment door 14 is rotated at the reference angle.

Also, as the detecting sensor 410 and the magnet 420 are positioned adjacent to the hinge shaft 32, door opening may be detected without interference with another configuration of surroundings.

When the magnet 420 is positioned below the detecting sensor 410 in the opening process of the first refrigerating compartment door 14, the detecting sensor 410 detects the magnetic of the magnet 420, and the controller 20 may control the motor 261 so that the push rod 27 returns to the initial position.

Meanwhile, the motor rotation detecting portion 290 may detect a rotation of an axis of the motor 261. In one example, a rotation plate may be connected to the axis of the motor 261. A plurality of slits may be spaced in a circumferential direction and arranged in the rotation plate.

In one example, the motor rotation detecting portion 290 may include a light emitting portion positioned on one side portion of the rotation plate and a light receiving portion positioned on the other side portion of the rotation plate.

Therefore, when the rotation plate is rotated together when the motor 261 is rotated, the motor rotation detecting portion 290 may detect the number of slits when the rotation plate is rotated. That is, the motor rotation detecting portion 290 outputs a pulse when it detects the slit, and the controller 20 may determine the rotational speed rpm of the motor 261 based on the pulse output from the motor rotation detecting portion 290, and may determine the moving distance of the push rod 27.

Hereinafter, an operation of the door opening device 25 is described.

Figure 6:
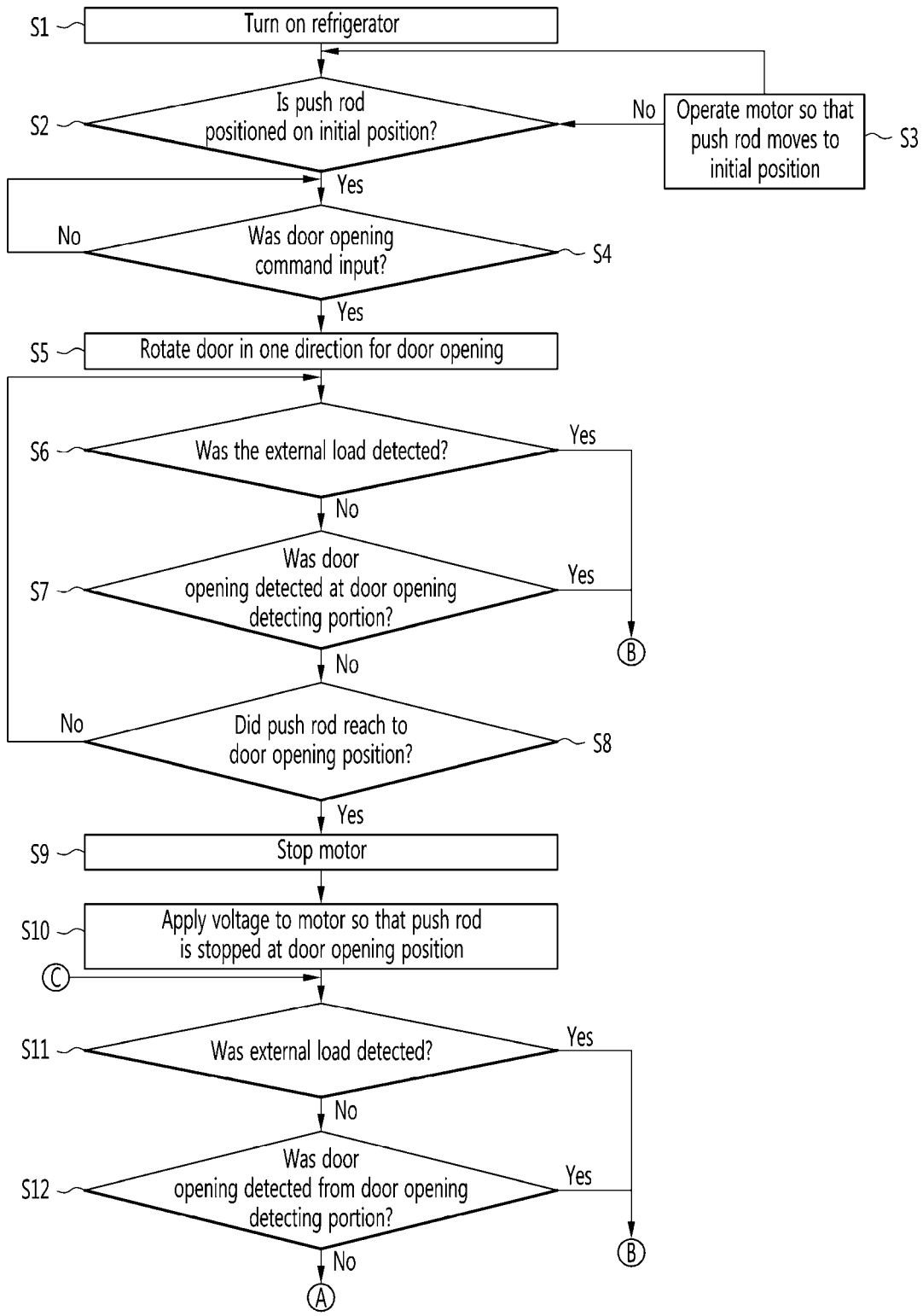
FIG. 6 and FIG. 7 are flowcharts illustrating an operation of the door opening device according to the first embodiment of the present invention.
Figure 7:
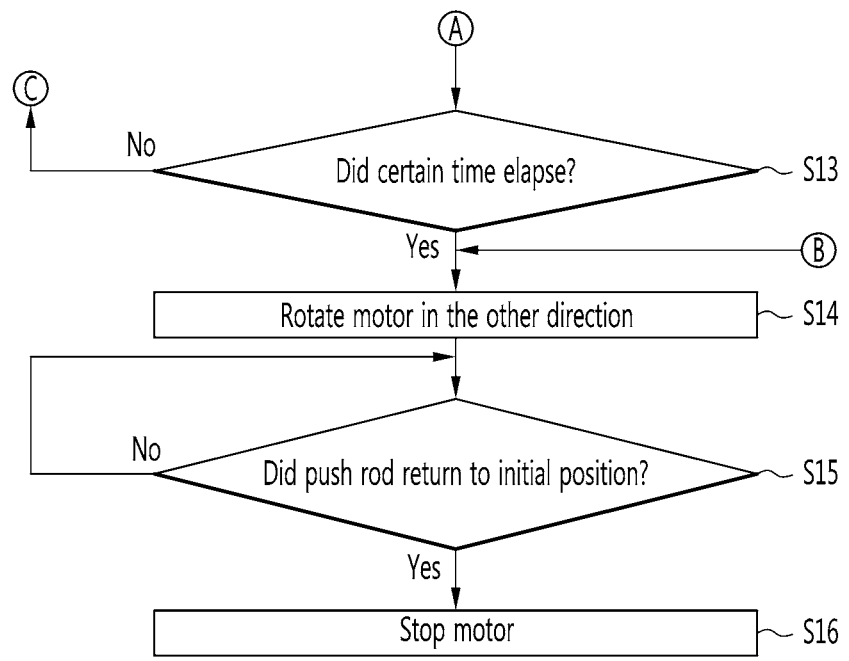
Figure 8:
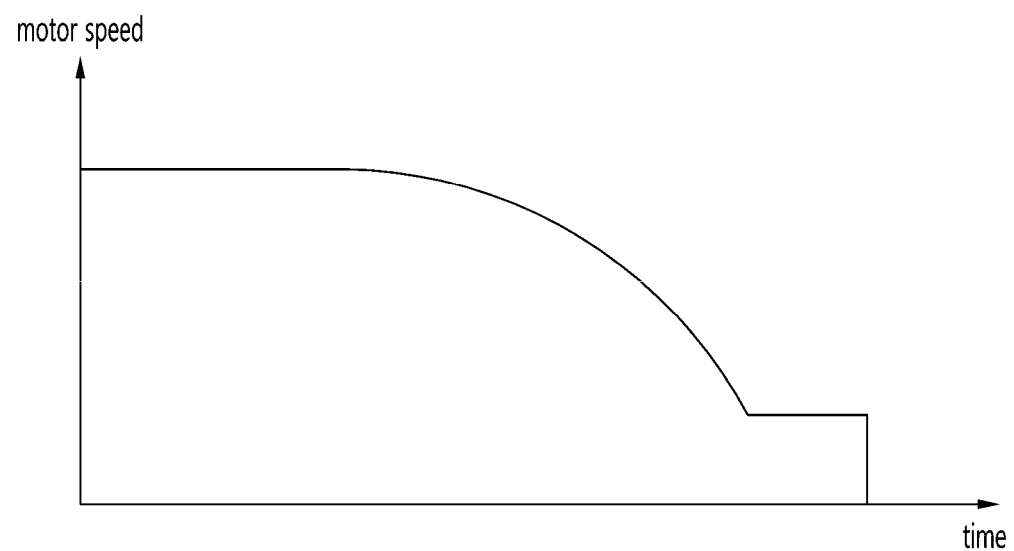
FIG. 8 is a graph illustrating a rotational speed of a motor in a door opening process.
Figure 9:
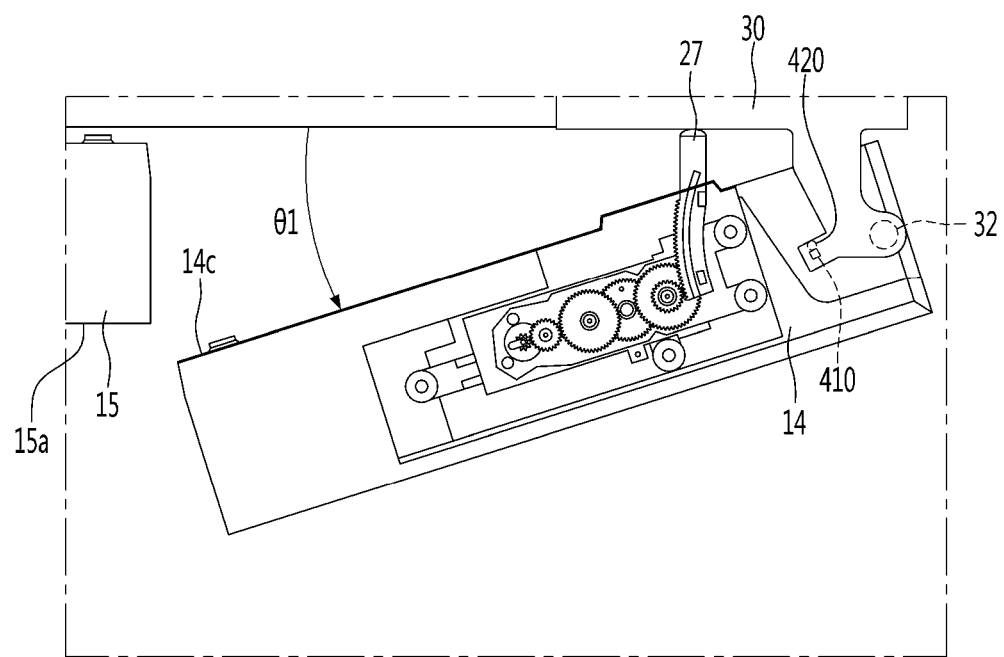
FIG. 9 is a view illustrating an opening state of a door by a push rod moving to a door opening position according to the first embodiment of the present invention.
Figure 10:
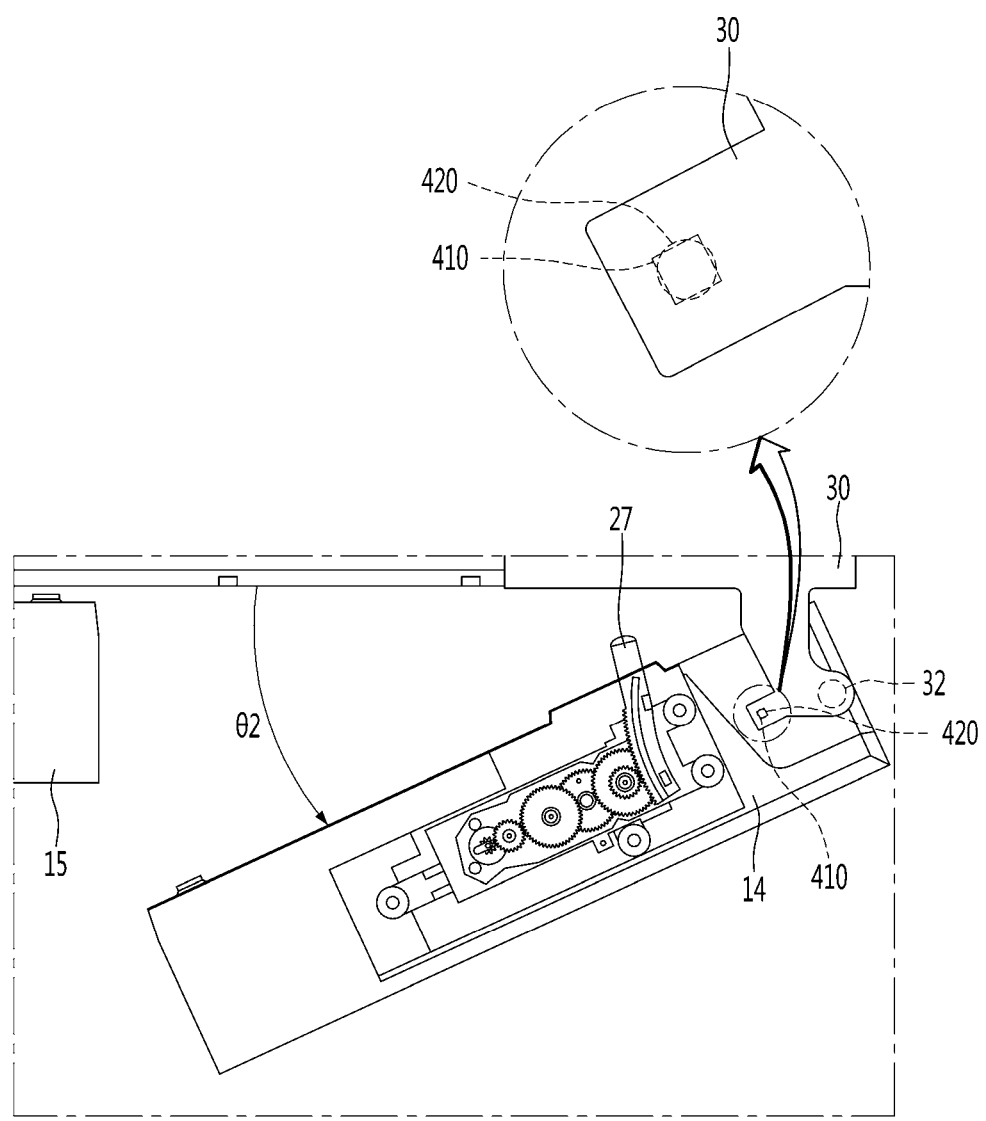
FIG. 10 is a view illustrating a state in which the first refrigerating compartment door is opened by a reference angle according to the first embodiment of the present invention.

FIG. 6 and FIG. 7 are flowcharts illustrating an operation of the door opening device according to the first embodiment of the present invention, FIG. 8 is a graph illustrating a rotational speed of a motor in a door opening process, FIG. 9 is a view illustrating an opening state of a door by the push rod moving to a door opening position according to the first embodiment of the present invention, and FIG. 10 is a view illustrating a state in which the first refrigerating compartment door is opened by a reference angle according to the first embodiment of the present invention.

With reference to FIGS. 1 to 9, power of the refrigerator 10 is turned on (S1).

When the power of the refrigerator 10 is turned on in step S1, the controller 20 determines whether the push rod 27 is positioned in the initial position (S2).

As a determination result in step S2, in the case in which the push rod 27 is not positioned in the initial position, the controller 20 operates the motor 261 so that the push rod 27 moves to the initial position (S3).

A state in which the push rod 27 is positioned in the initial position is a state in which the first position sensor 281 detects the magnet 275 of the push rod 27.

While the push rod 27 is positioned in the initial position, the controller 20 determines whether a door openings signal is input through the input portion 50 (S4).

As a determination result in step S4, when it is determined that the door opening signal is input, the controller 20 controls the motor 261 to be rotated in one direction for moving the push rod 27 from the initial position to the door opening position (S5).

That is, the controller 20 may supply a voltage to the motor 261 so that the motor 261 is rotated in a first direction for moving the push rod 27 from the initial position to the door opening position.

When the motor 261 is rotated in one direction, the plurality of gears 262, 263, 264, 265 and 266 are rotated in a normal direction, and the push rod 27 pushes the cabinet 11 and in a reaction to this, the first refrigerating compartment door 14 is rotated.

While the motor 261 is rotated in one direction, the controller 20 determines whether an external load acts on the first refrigerating compartment door 14 in a direction in which the first refrigerating compartment door 14 is closed (S6).

Specifically, when the motor 261 is rotated, a pulse is output from the motor rotation detecting portion 290. At this time, when the external load acts on the first refrigerating compartment door 14, the rotational speed of the motor 261 is reduced, and accordingly, the number of pulses output per unit time in the motor rotation detecting portion 290 is reduced.

Therefore, when the number of pulses output per unit time is equal to or less than the number of first detected loads, the external load may be determined to act on the first refrigerating compartment door 14.

However, in the initial operation of the motor 261, since the number of pulses output per unit time in the motor rotation detecting portion 290 may be equal to or less than the number of first detected loads, determination whether the external load is detected may be performed after the motor 261 operates in one direction and a certain time elapses.

If, in the case in which the motor 261 keeps operating while the number of pulses output per unit time in the motor rotation detecting portion 290 is equal to or less than the number of first detected loads, the push rod 27 and/or the gear may be damaged or the motor 261 may be damaged by the overload of the motor 261.

Therefore, in the present embodiment, when it is determined that the external load acts on the first refrigerating compartment door 14, the controller 20 rotates the motor 261 in the other direction so that the push rod 27 returns to the initial position (S14).

Meanwhile, as a determination result in step S6, when it is determined that the external load is not detected, the controller 20 determines whether the door opening detecting portion 40 detects door opening (S7).

In the present document, a case in which the door opening detecting portion 40 detects door opening while the motor 261 is rotated in one direction is a case in which the user rotates the first refrigerating compartment door 14 in a direction in which the first refrigerating compartment door 14 is opened.

At this time, an opening angle θ2 of the first refrigerating compartment door 14 when the door opening detecting portion 40 detects the door opening is larger than an opening angle θ1 of the first refrigerating compartment door 14 when the push rod 27 moves to the door opening position.

When rotated at equal to or more than the reference angle in the process that the first refrigerating compartment door 14 is rotated for the opening, the door opening detecting portion 40 may detect the door opening.

A projecting length of the push rod 27 from the first refrigerating compartment door 14 is increased while the motor 261 is rotated in one direction. If, the first refrigerating compartment door 14 is closed after the opening angle of the first refrigerating compartment door 14 is increased while the push rod 27 protrudes from the first refrigerating compartment door 14, the push rod 27 collides with the cabinet 11, and there is a problem that the push rod 27 is damaged or gears configuring the power transmitting mechanism is damaged.

At this time, as the opening angle of the first refrigerating compartment door 14 is larger, a greater impact force is applied to the push rod 27 when the first refrigerating compartment door 14 is closed. Also, as the projecting length of the push rod 27 from the first refrigerating compartment door 14 is longer, the possibility of damage of the push rod 27 is increased.

In the present embodiment, while the motor 261 is rotated in one direction, in order to prevent the damage of gears configuring the push rod 27 and/or the power transmitting mechanism due to the first refrigerating compartment door 14 closed after being opened by the user, in the case in which the door opening is detected at the door opening detecting portion 40, the controller 20 rotates the motor 261 in the other direction so that the push rod 27 returns to the initial position (S14).

In the present embodiment, in the process that the motor 261 operates in one direction and the push rod 27 moves from the initial position to the door opening position, when the door opening detecting portion 40 detects the door opening, the push rod 27 may return to the initial position by rotating the motor 261 in the other direction even before the push rod 27 moves to the door opening position.

Therefore, in the process that the first refrigerating compartment door 14 is rotated in a reclosing direction after being rotated at equal to or more than the reference angle, since the push rod 27 moves to the initial position, the damage of the push rod 27 and the gears by the collision of the push rod 27 and the cabinet 11 may be prevented.

Meanwhile, as a determination result in step S7, in the case in which the door opening is not detected at the door opening detecting portion 40 while the motor 261 is rotating in one direction, the controller 20 may determine whether the push rod 27 reaches to the door opening position (S8).

That is, when the motor 261 is rotated in one direction while the push rod 27 is positioned in the initial position, the push rod 27 is moved, and in this process, the magnet 275 of the push rod 27 is not detected in the first position sensor 281. And, in the moving process of the push rod 27, when the magnet 275 of the push rod 27 is detected at the second position sensor 282, the controller 20 may determine that the push rod 27 reaches to the door opening position.

As a determination result in step S8, when it is determined that the push rod 27 reaches to the door opening position, the controller 20 stops the motor 261 (S9).

In the case in which the rotational speed of the motor 261 is constant when the motor 261 is rotated in one direction and the push rod 27 moves from the initial position to the door opening position, the push rod 27 reaches to the door opening position, and the first refrigerating compartment door 14 can't stop smoothly and rattles in the process of the motor 261 being stopped. In this case, the user's emotional complaints may be caused.

Therefore, in the present embodiment, in the process that the motor 261 is rotated in one direction and the push rod 27 moves from the initial position to the door opening position, the rotational speed of the motor 261 is to be varied.

Specifically, with reference to FIG. 8, the controller 20 may control the motor 261 so that the motor 261 is rotated in a first reference speed until the number of pulses detected from the motor rotation detecting portion 290 reaches to a first reference number.

And, when the number of pulses detected from the motor rotation detecting portion 290 reaches to the first reference number, the controller 20 may control the motor 261 to reduce the rotational speed thereof until the number of pulses detected from the motor rotation detecting portion 290 reaches to a second reference number which is larger than the first reference number.

At this time, the controller 20 may control the rotational speed of the motor 261 to be reduced linearly or non-linearly.

And when the rotational speed of the motor 261 reaches to the second reference speed, the controller 20 may control the motor 261 to maintain the rotational speed thereof in the second reference speed. And, when the second position sensor 282 detects the magnet 275 of the push rod 27 while the rotational speed of the motor 261 is maintained in the second reference speed, the controller 20 may stop the motor 261.

Therefore, according to the embodiment, the moving speed of the push rod 27 is decreased while the push rod 27 moves from the initial position to the door opening position, and since the push rod 27 stops at the door opening position while the speed is decreased, a rattling phenomenon in the opening process of the first refrigerating compartment door 14 is prevented, and the first refrigerating compartment door 14 may be smoothly stopped.

At this time, a point of time when the number of pulses output from the motor rotation detecting portion 290 reaches to the first reference number may be a one point between a point bisecting a distance between the initial position and the door opening position of the push rod 27 and the door opening position.

As the rotational speed of the motor 261 is faster, the door opening time may be reduced.

Like in the present invention, in the case in which the point at which the number of pulses output from the motor rotation detecting portion 290 reaches to the first reference number is one point between the point bisecting the initial position and the door opening position of the push rod 27 and the door opening position, a high speed rotation time of the motor 261 may be sufficiently secured, and thus the door opening time may be reduced and the rattling of the door when the door is opened may be prevented.

Meanwhile, in the case in which the push rod 27 reaches to the door opening position, a portion of a rear surface 14*c* of the first refrigerating compartment door 14 may be positioned forward than a front surface 15*a* of the second refrigerating compartment door 15, and accordingly, a gap of a certain distance may be formed between one side end of the rear surface 14*c* of the first refrigerating compartment door 14 and one side end of the front surface 15*a* of the second refrigerating compartment door 15.

In the case in which both hands of the user are not available, the gap may be set so as to allow the user's elbow or foot to be inserted.

There is no limit, but the gap may be equal to or more than 40 mm. That is, a minimum horizontal distance between the rear surface 14*c* of the opened first refrigerating compartment door 14 and the front surface 15*a* of the closed second refrigerating compartment door 15 may be 40 mm.

In order for the gap to be equal to or more than 40 mm, the opening angle θ1 of the first refrigerating compartment door 14 may be equal to or more than 19 and less than 30 degrees at a position in which the push rod 27 reaches to the door opening position.

In the present embodiment, since the push rod 27 includes the curve-shaped rack gear 272, and is positioned adjacent to the hinge shaft 32, the projecting length of the push rod 27 is reduced but the opening angle θ1 of the first refrigerating compartment door 14 may be secured at the position in which the push rod 27 reaches to the door opening position.

Therefore, while the first refrigerating compartment door 14 is rotated at a certain angle, the opening angle θ1 of the first refrigerating compartment door 14 may be increased manually by inserting an elbow or foot to the gap.

Meanwhile, while the push rod 27 reaches to the door opening position and the motor 261 is stopped, the controller 20 supplies a voltage to the motor 261 so as to maintain a state in which the push rod 27 is stopped at the door opening position (S10).

That is, the controller 20 stops the motor 261 when the push rod 27 moves to the door opening position, and supplies the voltage to the motor 261 so as to maintain a state in which the push rod 27 is stopped at the door opening position while the motor 261 is stopped.

As described above, the push rod 27 is pushed toward the initial position by one or more of a weight of the first refrigerating compartment door 14 itself, a magnetic force of the magnet provided in the gasket (not shown) for the close contact of the first refrigerating compartment door 14 and the cabinet 11, and a closing force generated by the auto-close mechanism (not shown) provided in the hinge assembly 30 for the door to be closed automatically. In this case, a phenomenon that the motor 261 is rotated in other direction may occur.

However, in the present embodiment, since the voltage is supplied to the motor 261 so that the push rod 27 is maintained in the suspended state at the door opening position, the state in which the push rod 27 is stopped without being moved is maintained, and accordingly, the rotation of the motor 261 in the other direction is prevented.

However, a supply cycle of the voltage supplied to the motor 261 may be set based on the size of an external force acting on the push rod 27.

That is, even if the voltage is supplied to the motor 261, an axis of the motor 261 is not rotated due to the external force acting on the push rod 27, and the push rod 27 may maintain the suspended state. Therefore, even if the voltage is supplied to the motor 261, the pulse is not output from the motor rotation detecting portion 290.

The rotational speed of the motor 261 according to the embodiment may be varied by a duty of the voltage supplied to the motor 261. A certain size of voltage may be supplied to the motor 261 periodically, and the shorter the supply period of the voltage supplied to the motor 261 (or the larger the duty), the faster the rotational speed of the motor 261 may be.

In the present embodiment, the supply period of the voltage supplied to the motor 261 when the motor 261 maintains the second reference speed is longer than the supply period of the voltage supplied to the motor 261 when the push rod 27 reaches to the door opening position.

While the motor 261 is stopped, the controller 20 determines whether the external load acting on the first refrigerating compartment door 14 is detected in the direction in which the first refrigerating compartment door 14 is closed (S11).

Specifically, while the motor 261 is stopped, the pulse is not output from the motor rotation detecting portion 290. However, when the external load acts on the first refrigerating compartment door 14, since the motor 261 is rotated in the other direction, the pulse is output from the motor rotation detecting portion 290.

Therefore, when the number of pulses output per unit time is equal to or more than the number of second detected loads, it is determined that the external load acts on the first refrigerating compartment door 14. In the case in which the user forcibly closes the first refrigerating compartment door 14 while the motor 261 is stopped, there is a fear that the push rod 27 and or the gear may be damaged.

Therefore, in the present embodiment, when it is determined that the external load acts on the first refrigerating compartment door 14 while the push rod 27 is stopped at the door opening position, the controller 20 rotates the motor 261 in the other direction so that the push rod 27 returns to the initial position (S14).

Meanwhile, as a determination result in step S11, when it is determined that the external load does not act, the controller 20 determines whether the door opening detecting portion 40 detects the door opening (S12).

A case in which the door opening detecting portion 40 detects the door opening while the push rod 27 reaches to the door opening position is a case in which the user increases the opening angle of the first refrigerating compartment door 14.

As described above, the opening angle θ1 of the first refrigerating compartment door 14 while the push rod 27 reaches to the door opening position is smaller than the opening angle θ2 of the first refrigerating compartment door 14 while the door opening detecting portion 40 detects the opening of the first refrigerating compartment door 14.

Therefore, in the case in which the opening angle θ1 of the first refrigerating compartment door 14 is increased while the push rod 27 reaches to the door opening position, the door opening detecting portion 40 detects the door opening.

As a determination result in step S12, when it is determined that the door opening detecting portion 40 detects the opening of the door, the controller 20 may rotate the motor 261 in the other direction so that the push rod 27 returns to the initial position (S14).

In the case in which the first refrigerating compartment door 14 is rotated in a reclosing direction after rotated at equal to or more than the reference angle while the push rod 27 stops at the door opening position, the push rod 27 and or the gear may be damaged.

According to the embodiment, even before a certain time elapses while the push rod 27 is positioned at the door opening position, when it is determined that the opening of the door is detected at the door opening detecting portion 40, as the controller 20 rotates the motor 261 in the other direction so that the push rod 27 returns to the initial position, the damage of the push rod 27 and/or the gears may be prevented.

As a determination result in step S12, when it is determined that the opening of the door is not detected at the door opening detecting portion 40, the controller 20 may determine whether a certain time elapses after the push rod 27 reaches to the door opening position or the motor 261 is stopped (S13).

When the certain time elapses after the push rod 27 reaches to the door opening position, the controller 20 may control the motor 261 to be rotated in the other direction in order to return the push rod 27 to the initial position.

While the motor 261 is rotated in the other direction, the controller 20 may determine whether the push rod 27 reaches to the initial position (S15).

When it is determined that the push rod 27 reaches to the initial position, the controller 20 may stop the motor 261 (S16).

In the embodiment above, although it is described that the door opening detecting portion 40 includes the magnetic sensor and the magnet 275, in contrast, the door opening detecting portion 40 may include a light sensor.

In one example, the light sensor may include a light emitting portion provided in any one of the hinge assembly 30 and the first refrigerating compartment door 14 and a light receiving portion provided in the other one thereof, and when the first refrigerating compartment door 14 is rotated at the reference angle, light emitted from the light emitting portion may reach to the light receiving portion. And, when the light reaches to the light receiving portion, the controller 20 may control the motor 261 so that the push rod 27 returns to the initial position.

Or, the light emitting portion and the light receiving portion are provided in any one of the hinge assembly 30 and the first refrigerating compartment door 14, and a reflecting plate may be provided in the other one thereof. And when the first refrigerating compartment door 14 is rotated at the reference angle, the light emitted from the light emitting portion is reflected by the reflecting plate and may reach to the light receiving portion. And, when the light reaches to the light receiving portion, the controller 20 may control the motor 261 so that the push rod 27 returns to the initial position.

Also, in the embodiment above, the position of the push rod 27 is detected by the position detecting portion 28 and the motor 261 is controlled based on this. In contrast, the operation of the motor 261 may be controlled based on the operating time of the motor 261. For example, the motor 261 is operated for the door opening and when a first reference time elapses, the motor 261 may be stopped. Also the motor 261 is operated for returning the push rod 27 to the initial position and the motor 261 may be stopped when a second reference time elapses.

Figure 11:
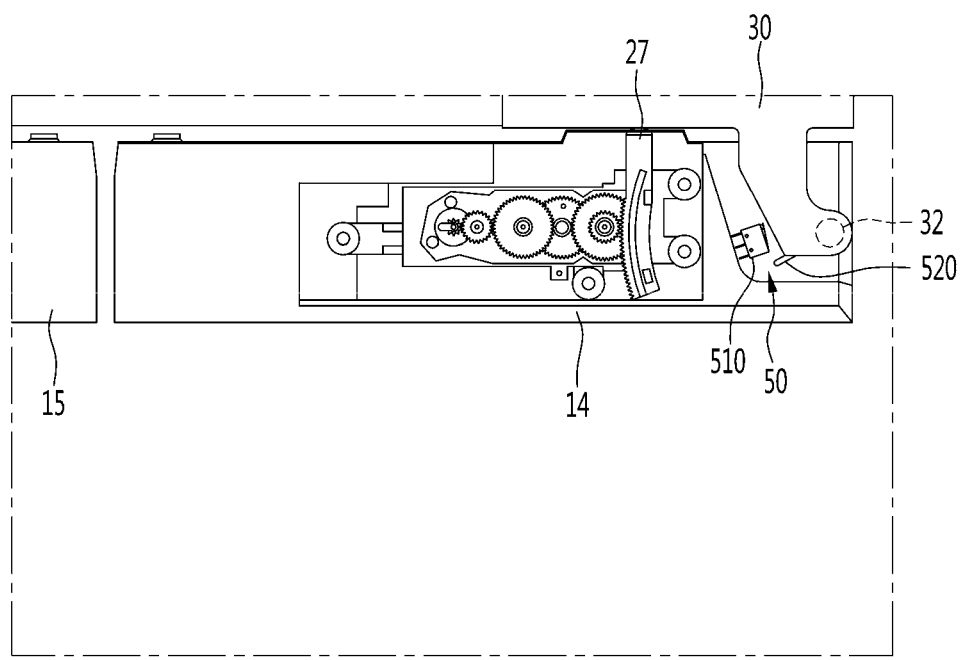
FIG. 11 is a view illustrating a closing state of the first refrigerating compartment door according to a second embodiment of the present invention.
Figure 12:
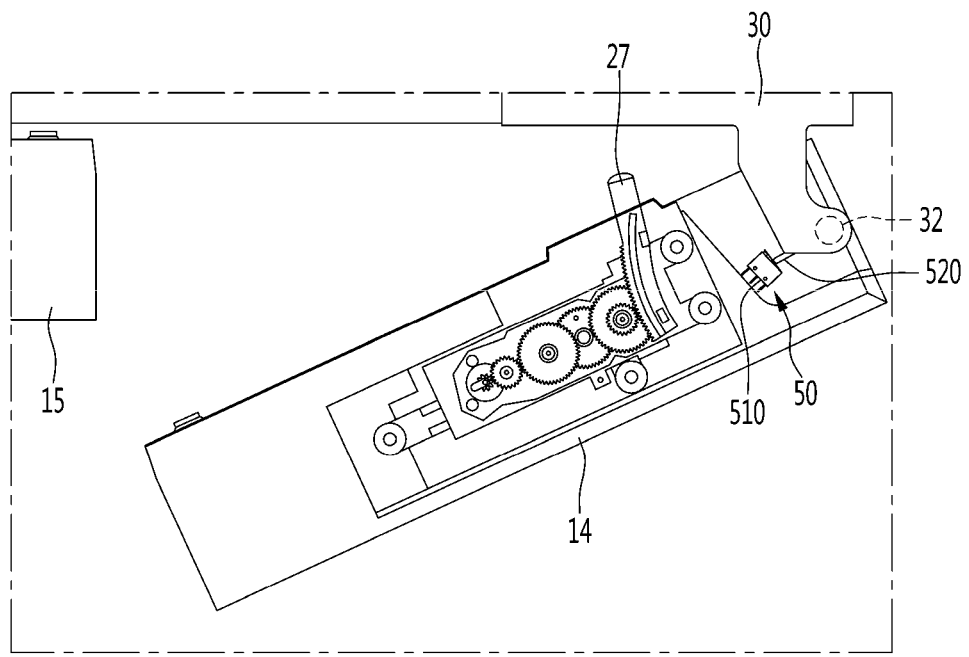
FIG. 12 is a view illustrating a state in which a door opening detecting portion detects an opening of the first refrigerating compartment door according to the second embodiment of the present invention.

FIG. 11 is a view illustrating a closing state of the first refrigerating compartment door according to a second embodiment of the present invention. FIG. 12 is a view illustrating a state in which a door opening detecting portion detects an opening of the first refrigerating compartment door according to the second embodiment of the present invention.

The present embodiment is same as the first embodiment in the other part, but different in a door opening detecting portion. Therefore, hereinafter, only a characteristic part of the present embodiment will be described.

With reference to FIGS. 11 to 12, a door opening detecting portion 50 according to a second embodiment, may include a micro switch 510 which is turned on when the first refrigerating compartment door 14 is rotated at a reference angle.

The micro switch 510 may be provided in any one of the hinge assembly 30 and the first refrigerating compartment door 14.

The door opening detecting portion 50 is provided in the other one of the hinge assembly 30 and the first refrigerating compartment door 14. When the first refrigerating compartment door 14 is rotated at the reference angle, a switch control portion 520 may be further included for turning on the micro switch 510.

According to the arrangement of the micro switch 510 and the switch control portion 520, in the case in which the first refrigerating compartment door 14 is rotated at less than the reference angle, the micro switch 510 maintains an off state, and when the micro switch 510 is rotated at equal to or more than the reference angle, the micro switch 510 may maintain an on state by the switch control portion 520.

Or according to the arrangement of the micro switch 510 and the switch control portion 520, in the case in which the first refrigerating compartment door 14 is rotated at less than the reference angle, the micro switch 510 maintains the off state, and when the micro switch is rotated at the reference angle, the micro switch 510 is turned on by the switch control portion 520, and when the micro switch 510 is rotated at equal to or more than the reference angle, the micro switch 510 may be turned off again.

In any case, when the first refrigerating compartment door 14 is rotated at the reference angle, the micro switch 510 may be turned on, and when it is detected that the micro switch 510 is turned on, the controller 20 may control the motor 261 so that the push rod 27 returns to the initial position while the push rod 27 moves to the door opening position or stops at the door opening position.

In the present embodiment, the micro switch 510 may be disposed on a position adjacent to the hinge shaft 32.

In the case in which the micro switch 510 disposed in the first refrigerating compartment door 14, when the first refrigerating compartment door 14 is rotated centering on the hinge shaft 32, since a rotating radius of the micro switch 510 is small, the length of the switch control portion 520 may be minimized.

In the case in which the micro switch 510 is disposed in the hinge assembly 30, the switch control portion 520 may be positioned adjacent to the hinge shaft 32. Even in this case, when the first refrigerating compartment door 14 is rotated centering on the hinge shaft 32, since the rotating radius of the switch control portion 520 is small, the length of the switch control portion 520 may be minimized.

Also according to the present embodiment, when the first refrigerating compartment door 14 is rotated at equal to or more than the reference angle, since the micro switch 510 is turned on, it may be accurately detected that the first refrigerating compartment door 14 is rotated at equal to or more than the reference angle.

Also, as the micro switch 510 and the switch control portion 520 are positioned adjacent to the hinge shaft 32, the door opening may be detected without interference with other configuration of surrounding.

Figure 13:
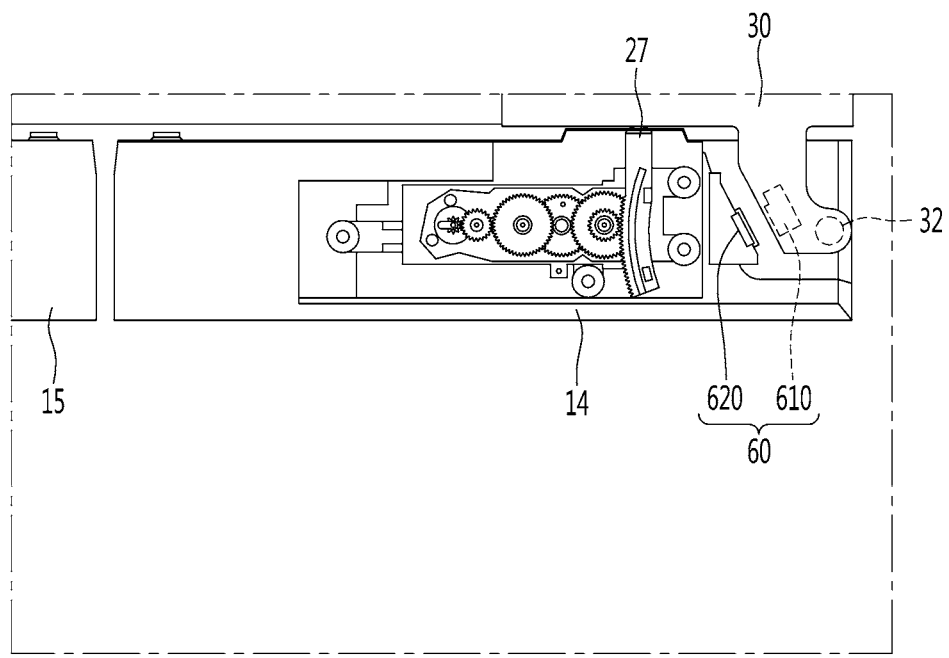
FIG. 13 is a view illustrating a closing state of the first refrigerating compartment door according to a third embodiment of the present invention.
Figure 14:
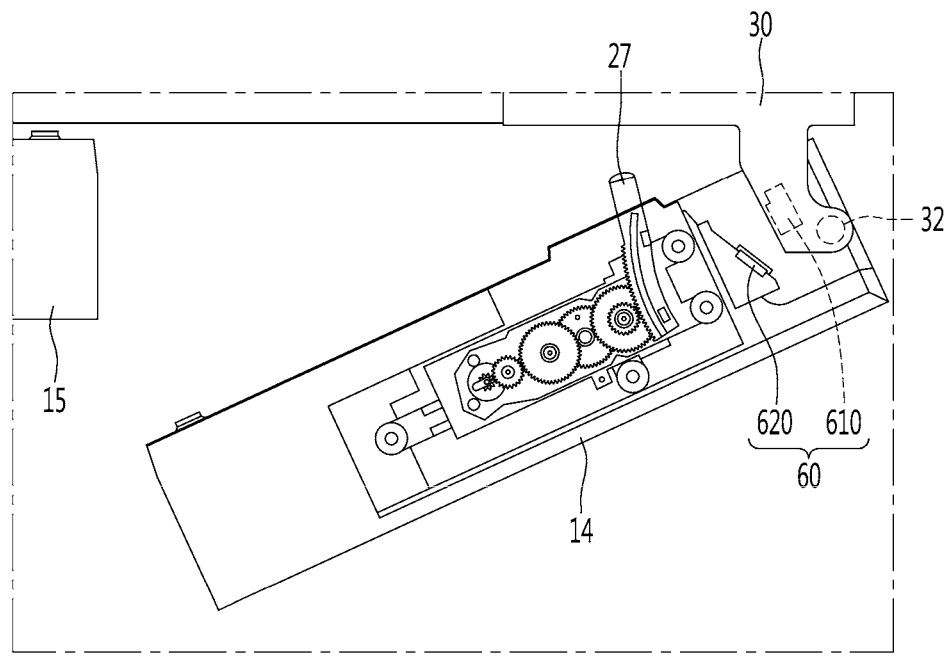
FIG. 14 is a view illustrating a state in which the door opening detecting portion detects an opening of the first refrigerating compartment door according to the third embodiment of the present invention.

FIG. 13 is a view illustrating a closing state of the first refrigerating compartment door according to a third embodiment of the present invention, and FIG. 14 is a view illustrating a state in which the door opening detecting portion detects an opening of the first refrigerating compartment door according to the third embodiment of the present invention.

The present embodiment is same as the first embodiment in the other part, but different in a door opening detecting portion. Therefore, hereinafter, only a characteristic part of the present embodiment will be described.

With reference to FIGS. 13 to 14, a door opening detecting portion 60 according to a third embodiment of the present embodiment may include a magnet sensor 610 turned off when the first refrigerating compartment door 14 is rotated at a reference angle, and a magnet 620 which may provide a magnetic force to the magnet sensor 610.

The magnet sensor 610 is a sensor which is turned on since a point of contact is attached in the case in which a magnetic force of a certain size is acting, and turned off since the point of contact is separated in the case in which a magnetic force equal to or less than the certain size is acting, and since a known sensor may be used, a detailed description will be omitted.

The magnet sensor 610 may be provided in any one of the hinge assembly 30 and the first refrigerating compartment door 14, and the magnet 620 may be provided in the other one of the hinge assembly 30 and the first refrigerating compartment door 14.

In the case in which the first refrigerating compartment door 14 is rotated at less than the reference angle, the magnet sensor 610 maintains the on state by the magnetic force of the magnet 620, and in the case in which the first refrigerating compartment door 14 is rotated at equal to or more than the reference angle, the magnet sensor 610 may be turned off.

At this time, even if the strength of the magnetic force of the magnet 620 is not strong, in order to turn off the magnet sensor 610 only in the case in which the first refrigerating compartment door 14 is rotated at equal to or more than the reference angle, the magnet sensor 610 and the magnet 620 may be positioned adjacent to the hinge shaft 32.

Also, as the magnet sensor 610 and the magnet 620 are positioned adjacent to the hinge shaft 32, the door opening may be detected without interference with other configuration of the surrounding.

In the embodiments above, the magnetic sensor, micro switch, light sensor, and magnet sensor may be collectively called as a sensor outputting a signal corresponding a case in which the refrigerator door is rotated at equal to or more than the reference angle.

Figure 15:
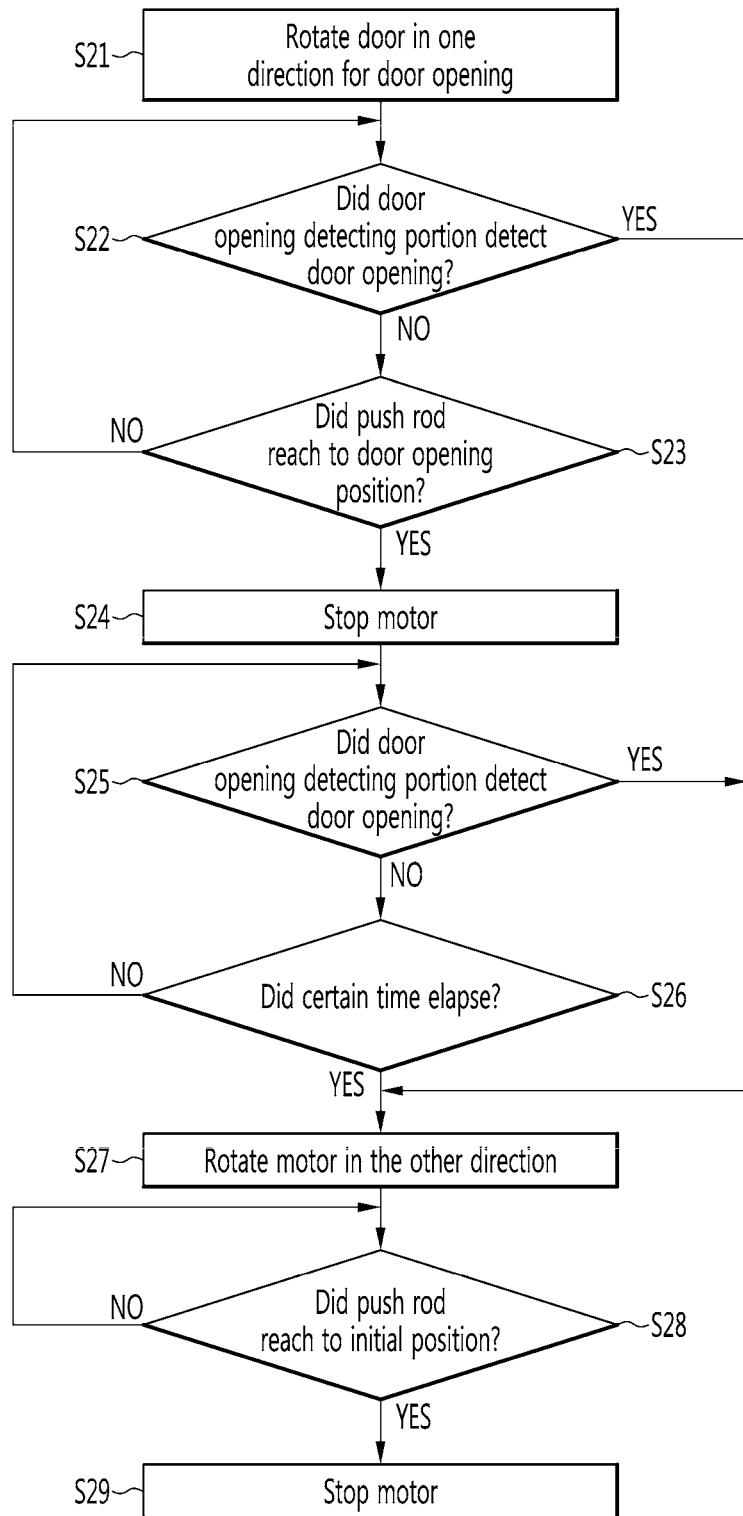
FIG. 15 is a flowchart illustrating an operation of the door opening device according to a fourth embodiment of the present invention.

FIG. 15 is a flowchart illustrating an operation of the door opening device according to a fourth embodiment of the present invention.

The present embodiment is same as the first embodiment in the other part, but proposes a simplified control method of the door opening device than the control method of the door opening device of the first embodiment. Therefore, hereinafter, only a characteristic part of the present embodiment will be described.

With reference to FIG. 15, while the first refrigerating compartment door 14 closes the refrigerating compartment 111, the push rod 27 may be positioned in an initial position. In the initial position, the first position sensor 281 detects the magnet 275 of the push rod 27.

While the push rod 27 is positioned in the initial position, the push rod 27 is in contact with the front surface of the cabinet 11 or may be spaced apart from the front surface of the cabinet 11.

When it is determined that a door opening signal is input, the controller 20 controls the motor 261 to be rotated in one direction (S21).

When the motor 261 is rotated in one direction, the plurality of gears 262, 263, 264, 265 and 266 are rotated in a normal direction, the push rod 27 pushes the cabinet 11 and in a reaction to this, the first refrigerating compartment door 14 is rotated.

While the motor 261 is rotated in one direction, the controller 20 determines whether the door opening detecting portion 40 detects the door opening (S22).

In the present document, a case in which the door opening detecting portion 40 detects the door opening while the motor 261 is rotated in one direction is a case in which the user rotates the first refrigerating compartment door 14 in a direction in which the first refrigerating compartment door 14 is opened.

At this time, the opening angle θ2 of the first refrigerating compartment door 14 when the door opening detecting portion 40 detects the door opening is larger than the opening angle θ1 of the first refrigerating compartment door 14 when the push rod 27 moves to the door opening position.

In the process that the first refrigerating compartment door 14 is rotated for the opening, when the first refrigerating compartment door 14 is rotated at equal to or more than the reference angle, the door opening detecting portion 40 may detect the door opening.

In the present embodiment, for preventing the damage of the push rod 27 and/or the gears configuring the power transmitting mechanism in the process that the first refrigerating compartment door 14 is closed after being opened by the user while the motor 261 is rotated in one direction, in the case in which the door opening is detected at the door opening detecting portion 40 while the motor 261 is rotated in one direction, the controller 20 rotates the motor 261 in the other direction so that the push rod 27 returns to the initial position (S27).

According to the present embodiment, in the case in which the door opening detecting portion 40 detects the door opening in the process that the motor 261 is rotated in one direction and the push rod 27 moves from the initial position to the door opening position, as the motor 261 is rotated in the other direction even before the push rod 27 moves to the door opening position, the push rod 27 may return to the initial position.

Therefore, in the process that the first refrigerating compartment door 14 is rotated in the reclosing direction after being rotated at equal to or more than the reference angle, since the push rod 27 moves to the initial position, the damage of the push rod 27 and the gears due to the collision of the push rod 27 and the cabinet 11 may be prevented.

Meanwhile, as a determination result in step S22, in the case in which the door opening is not detected from the door opening detecting portion 40 while the motor 261 is rotated in one direction, the controller 20 may determine whether the push rod 27 reaches to the door opening position (S23).

That is, when the motor 261 is rotated in one direction while the push rod 27 is positioned in the initial position, the push rod 27 is moving, and in this process, the magnet 275 of the push rod 27 is not detected at the first position sensor 281. And in the moving process of the push rod 27, when the magnet 275 of the push rod 27 is detected at the second position sensor 282, the controller 20 may determine that the push rod 27 reaches to the door opening position.

As a determination result in step S23, when it is determined that the push rod 27 reaches to the door opening position, the controller 20 may stop the motor 261 (S24).

In the case in which the push rod 27 reaches to the door opening position, a portion of the rear surface 14c of the first refrigerating compartment door 14 may be positioned forward than the front surface 15a of the second refrigerating compartment door 15, and accordingly, a certain distance gap may be formed between one side end of the rear surface 14c of the first refrigerating compartment door 14 and one side end of the front surface 15a of the second refrigerating compartment door 15.

In the case in which both hands of the user are not available, the gap may be set so as to allow the user's elbow or foot to be inserted.

Therefore, while the first refrigerating compartment door 14 is rotated in a certain angle, the opening angle θ1 of the first refrigerating compartment door 14 may be increased manually by inserting the elbow or foot to the gap.

Meanwhile, while the push rod 27 reaches to the final position and the motor 261 is stopped, the controller 20 may determine whether the door opening detecting portion 40 detects the door opening (S25).

A case in which the door opening detecting portion 40 detects the door opening while the push rod 27 reaches to the door opening position is a case in which the user increases the opening angle of the first refrigerating compartment door 14.

As described above, the opening angle θ1 of the first refrigerating compartment door 14 while the push rod 27 reaches to the door opening position is smaller than the opening angle θ2 of the first refrigerating compartment door 14 when the door opening detecting portion 40 detects the opening of the first refrigerating compartment door 14.

Therefore, in the case in which the opening angle of the first refrigerating compartment door 14 is increased while the push rod 27 reaches to the door opening position, the door opening detecting portion 40 detects the door opening.

As a determination result in step S25, when it is determined that the door opening detecting portion 40 detects the opening of the door, the controller may rotate the motor 261 in the other direction so that the push rod 27 returns to the initial position (S27).

Even if the first refrigerating compartment door 14 is rotated in the reclosing direction after being rotated at equal to or more than the reference angle while the push rod 27 reaches to the door opening position, the push rod 27 and/or the gears may be damaged.

Therefore, in the present embodiment, even before a certain time elapses while the push rod 27 is positioned in the door opening position, when it is determined that the opening of the door is detected at the door opening detecting portion 40, as the controller 20 rotates the motor 261 in the other direction so that the push rod 27 returns to the initial position, the damage of the push rod 27 and/or the gears may be prevented.

As a determination result in step S25, when it is determined that the opening of the door is not detected at the door opening detecting portion 40, the controller 20 may determine whether a certain time elapses from a point of time when the push rod 27 reaches to the door opening position or a point of time when the motor 261 is stopped (S26).

If the time when the push rod 27 reaches to the door opening position elapses for the certain time, the controller 20 may control the motor 261 to be rotated in the other direction for returning the push rod 27 to the initial position.

While the motor 261 is rotated in the other direction, the controller 20 may determine whether the push rod 27 reaches to the initial position (S28).

When it is determined that the push rod 27 reaches to the initial position, the controller 20 may stop the motor 261 (S29).

The invention claimed is:

1. A refrigerator comprising:
   a cabinet in which a storage compartment is formed;
   a refrigerator door for opening and closing the storage compartment;
   a door opening device having a push rod which moves from an initial position to a door opening position for opening the refrigerator door and a motor for providing power to the push rod;
   a door opening detecting portion for detecting whether the refrigerator door is opened at equal to or more than a reference angle; and
   a controller controlling the motor,
   wherein the controller controls the push rod to move to the door opening position while in close contact with the cabinet or the refrigerator door in order to open the refrigerator door,
   wherein when the door opening detecting portion detects that the refrigerator door is opened at equal to or more than a reference angle before the push rod moves to the door opening position, the controller controls the motor so that the push rod returns to the initial position,
   wherein the reference angle is larger than an opening angle of the door when the push rod moves to the door opening position.

2. The refrigerator of claim 1, wherein when the push rod reaches to the door opening position before the door opening detecting portion detects that the refrigerator door is opened at equal to or more than the reference angle, the motor is stopped, and when a certain time elapses while the push rod is moved to the door opening position and the motor is stopped, the controller controls the motor so that the push rod returns from the door opening position to the initial position.

3. The refrigerator of claim 2, wherein when the door opening detecting portion detects that the refrigerator door is opened at equal to or more than the reference angle before the certain time elapses while the push rod is moved to the door opening position and the motor is stopped, the controller controls the motor so that the push rod returns to the initial position.

4. The refrigerator of claim 1, further comprising a hinge assembly having a hinge shaft for connecting the cabinet and the refrigerator door,
   wherein the door opening detecting portion includes a sensor outputting a signal and located adjacent to the hinge shaft.

5. The refrigerator of claim 4, wherein the door opening detecting portion includes a magnet provided in any one of the hinge assembly and the refrigerator door.

6. The refrigerator of claim 5, wherein the sensor is a magnetic sensor detecting a magnetic of the magnet, and provided in the other one of the hinge assembly and the refrigerator door.

7. The refrigerator of claim 5, wherein the sensor is a magnet sensor which is turned on by magnet when the refrigerator door is opened at less than the reference angle and which is turned off when the refrigerator door is opened at equal to or more than the reference angle, and provided in the other one of the hinge assembly and the refrigerator door.

8. The refrigerator of claim 4, wherein the sensor is a micro switch provided in any one of the hinge assembly and the refrigerator door.

9. The refrigerator of claim 8, wherein the door opening detecting portion further includes a switch control portion provided in the other one of the hinge assembly and the refrigerator door and turning on the micro switch when the refrigerator door is opened by the reference angle.

10. The refrigerator of claim 4, wherein the sensor includes a light emitting portion and a light receiving portion, and
   when the refrigerator door rotates at the reference angle, light emitted from the light emitting portion reaches to the light receiving portion, and
   when the light reaches to the light receiving portion, the controller determines that the refrigerator door is opened by the reference angle.

11. The refrigerator of claim 10, wherein the light emitting portion and the light receiving portion are disposed in any one of the refrigerator door and the hinge assembly.

12. The refrigerator of claim 10, wherein the light emitting portion is disposed in any one of the refrigerator door and the hinge assembly, and the light receiving portion is disposed in the other one of the refrigerator door and the hinge assembly.

13. The refrigerator of to claim 1, wherein the push rod includes an arc-shaped rack gear which receives the power of the motor.

14. The refrigerator of to claim 1, wherein the door opening device is provided in the refrigerator door and the push rod pushes a front surface of the cabinet to open the refrigerator door.

* * * * *